US008948936B2

(12) United States Patent
Shue et al.

(10) Patent No.: US 8,948,936 B2
(45) Date of Patent: Feb. 3, 2015

(54) VEHICLE MANAGEMENT SYSTEM USING FINITE STATE MACHINES

(71) Applicants: Shyhpyng Jack Shue, Grapevine, TX (US); John J. Shillings, Fort Worth, TX (US)

(72) Inventors: Shyhpyng Jack Shue, Grapevine, TX (US); John J. Shillings, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/915,147

(22) Filed: Jun. 11, 2013

(65) Prior Publication Data

US 2013/0261853 A1 Oct. 3, 2013

Related U.S. Application Data

(63) Continuation-in-part of application No. 11/665,138, filed as application No. PCT/US2005/040394 on Nov. 8, 2005, now Pat. No. 8,473,124.

(60) Provisional application No. 60/625,848, filed on Nov. 8, 2004.

(51) Int. Cl.
*B64C 19/00* (2006.01)

(52) U.S. Cl.
USPC ...................... 701/4; 700/29; 700/44; 700/90

(58) Field of Classification Search
USPC ........ 701/3, 4, 11, 24, 13, 23, 12; 700/29, 44, 700/90, 28; 244/158 R, 164, 176
See application file for complete search history.

(56) References Cited

U.S. PATENT DOCUMENTS 5,796,922 A 8/1998 Smith
6,089,507 A 7/2000 Parvez et al.
6,539,290 B1 3/2003 Vos
6,729,139 B2 5/2004 Desai et al.
7,277,764 B2 10/2007 Hovakimyan et al.
7,551,989 B2 * 6/2009 Knotts et al. ...................... 701/3
8,311,687 B2 * 11/2012 Bakker ............................ 701/3
8,588,996 B2 * 11/2013 Hill et al. ......................... 701/3
2003/0094001 A1 5/2003 Desai et al.

(Continued)

OTHER PUBLICATIONS

Office Action dated Sep. 3, 2010 from counterpart U.S. Appl. No. 11/665,138.

(Continued)

*Primary Examiner* — Ronnie Mancho
(74) *Attorney, Agent, or Firm* — James E. Walton; Richard G. Eldredge

(57) ABSTRACT

A system includes a plurality of actuators and a management system operably associated with the plurality electronic and mechanical devices. The management architecture includes interfaces configured to the entire electronics and mechanics to provide a parameter to a computer. The computer includes a control and management architecture using modular finite state flow designs configured to analyze the parameter. The computer with a plurality of finite state machines can conduct a plurality of control laws operably associated with one or more actuators for finite functions of mobility. The method includes matching the parameter with the finite state machine and controlling the actuator via control law operably associated with finite state machine. The method can therefore be achieved either manually, semi-autonomously and autonomously with seamless and switchless control using a central control computer with integration of electronic and mechanic sensors and devices.

20 Claims, 25 Drawing Sheets

(56) References Cited

U.S. PATENT DOCUMENTS

| | | | | |
|---|---|---|---|---|
| 2005/0004723 | A1 | 1/2005 | Duggan et al. | |
| 2007/0050100 | A1* | 3/2007 | Gustafson et al. | 701/3 |
| 2009/0012657 | A1* | 1/2009 | Knotts et al. | 701/3 |
| 2012/0029735 | A1* | 2/2012 | Bakker | 701/3 |
| 2012/0101666 | A1* | 4/2012 | Hill et al. | 701/3 |
| 2013/0112804 | A1* | 5/2013 | Zhu | 244/2 |

OTHER PUBLICATIONS

Amendment dated Sep. 20, 2010 from counterpart U.S. Appl. No. 11/665,138.
Final Office Action dated Dec. 8, 2010 from counterpart U.S. Appl. No. 11/665,138.
Interview Summary dated Jan. 19, 2011 from counterpart U.S. Appl. No. 11/665,138.
Amendment After Final dated Feb. 8, 2011 from counterpart U.S. Appl. No. 11/665,138.
Advisory Action dated Feb. 17, 2011 from counterpart U.S. Appl. No. 11/665,138.
Office Action dated Mar. 30, 2011 from counterpart U.S. Appl. No. 11/665,138.
Interview Summary dated Jul. 14, 2011 from counterpart U.S. Appl. No. 11/665,138.
Amendment dated Jul. 29, 2011 from counterpart U.S. Appl. No. 11/665,138.
Final Office Action dated Nov. 17, 2011 from counterpart U.S. Appl. No. 11/665,138.
Amendment After Final dated Jan. 12, 2012 from counterpart U.S. Appl. No. 11/665,138.
Advisory Action dated Jan. 20, 2012 from counterpart U.S. Appl. No. 11/665,138.
Notice of Allowance dated Nov. 8, 2012 from counterpart U.S. Appl. No. 11/665,138.
Chinese Office Action dated May 27, 2009 from counterpart CN App. No. 2005800377971.
Chinese Decision to Grant dated Oct. 16, 2009 from counterpart CN App. No. 2005800377971.
Canadian Office Action dated Oct. 22, 2010 from counterpart CA App. No. 2,585,105.
European Search Report dated Feb. 6, 2008 from counterpart EP App. No. 05858477.2.
European Search Report dated Mar. 18, 2011 from counterpart EP App. No. 05858477.2.
European Search Report dated Sep. 22, 2011 from counterpart EP App. No. 05858477.2.
European Amendment dated Dec. 29, 2011 from counterpart EP App. No. 05858477.2.
European Amendment dated Jul. 14, 2011 from counterpart EP App. No. 05858477.2.
European Amendment dated Jul. 30, 2009 from counterpart EP App. No. 05858477.2.
Canadian Amendment dated Apr. 14, 2011 from counterpart CA App. No. 2,585,105.
Canadian Office Action dated Jul. 18, 2013 from counterpart CA App. No. 2,585,105.

* cited by examiner

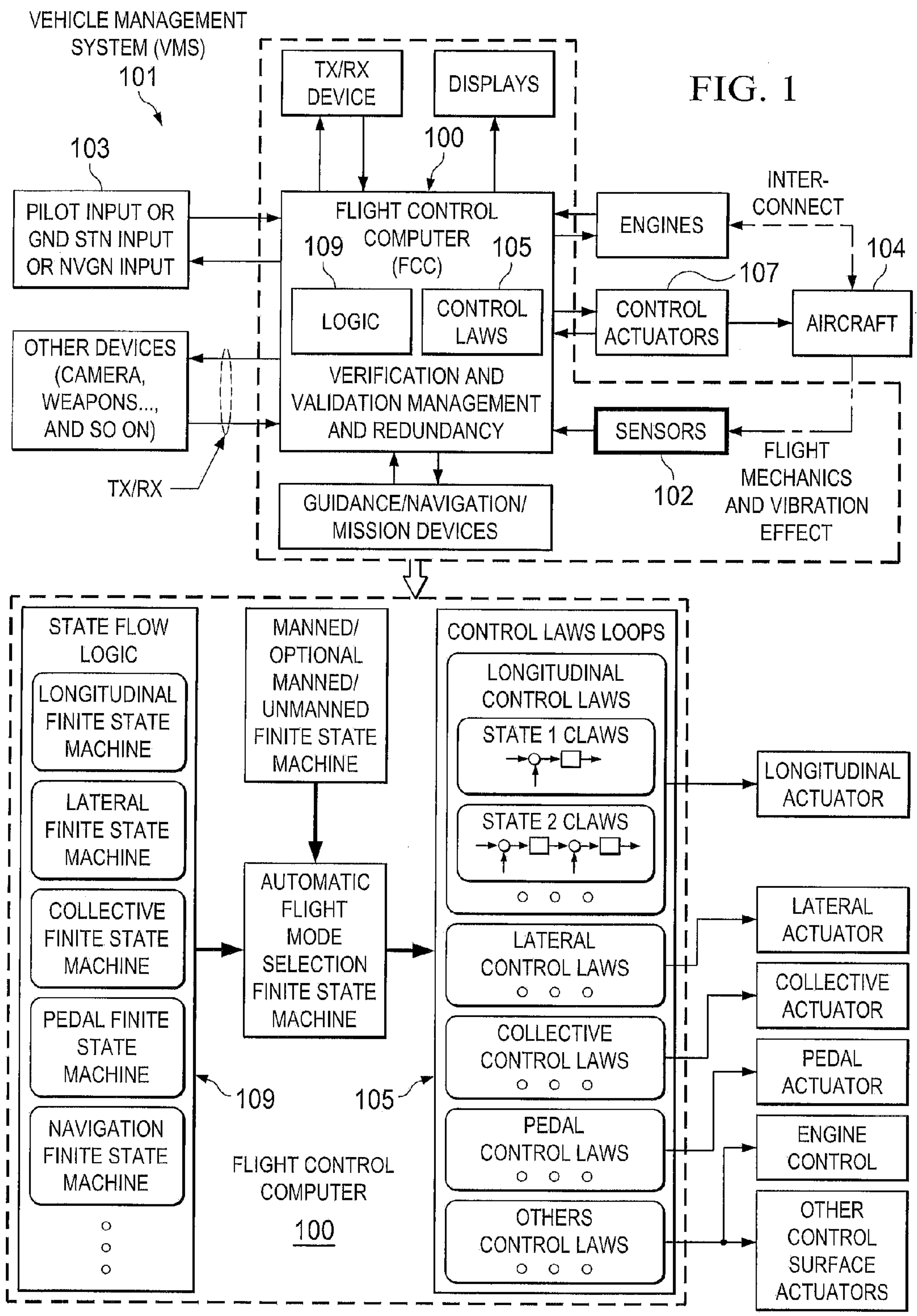

VEHICLE MANAGEMENT SYSTEM (VMS)
101
TX/RX DEVICE
DISPLAYS
FIG. 1
103
100
PILOT INPUT OR GND STN INPUT OR NVGN INPUT
FLIGHT CONTROL COMPUTER (FCC)
109
105
LOGIC
CONTROL LAWS
ENGINES
INTER-CONNECT
104
107
CONTROL ACTUATORS
AIRCRAFT
OTHER DEVICES (CAMERA, WEAPONS..., AND SO ON)
VERIFICATION AND VALIDATION MANAGEMENT AND REDUNDANCY
SENSORS
TX/RX
FLIGHT MECHANICS AND VIBRATION EFFECT
102
GUIDANCE/NAVIGATION/ MISSION DEVICES
STATE FLOW LOGIC
LONGITUDINAL FINITE STATE MACHINE
LATERAL FINITE STATE MACHINE
COLLECTIVE FINITE STATE MACHINE
PEDAL FINITE STATE MACHINE
NAVIGATION FINITE STATE MACHINE
MANNED/ OPTIONAL MANNED/ UNMANNED FINITE STATE MACHINE
AUTOMATIC FLIGHT MODE SELECTION FINITE STATE MACHINE
109
105
FLIGHT CONTROL COMPUTER
100
CONTROL LAWS LOOPS
LONGITUDINAL CONTROL LAWS
STATE 1 CLAWS
STATE 2 CLAWS
LATERAL CONTROL LAWS
COLLECTIVE CONTROL LAWS
PEDAL CONTROL LAWS
OTHERS CONTROL LAWS
LONGITUDINAL ACTUATOR
LATERAL ACTUATOR
COLLECTIVE ACTUATOR
PEDAL ACTUATOR
ENGINE CONTROL
OTHER CONTROL SURFACE ACTUATORS

2401

PEDAL POSITION (INCH)
1
0.5
0
-0.5
0
5
10
15
20
25
30
35
TIME(S)
FORWARD VELOCITY (KNOTS)
0.2
0
-0.2
-0.4
-0.6
TIME(S)
YAW ANGLE (DEGREE)
200
100
0
-100
TIME(S)
HEADING HOLD
PEDAL SCAS
HEADING HOLD
PEDAL STATE
3
2
1
0
TIME(S)

2501

COLLECTIVE POSITION (INCH)
1
0.5
0
-0.5
-1
0
5
10
15
20
25
30
35
TIME(S)
VERTICAL SPEED (FT/S)
10
0
-10
-20
TIME(S)
ALTITUDE (FT)
250
200
150
100
50
0
TIME(S)
RADAR ALTITUDE HOLD
DIRECT (MANUAL)
VERTICAL SPEED HOLD
BAROMETRIC ALTITUDE HOLD
COLLECTIVE STATE
4
3
2
1
0
-1
TIME(S)

VEHICLE MANAGEMENT SYSTEM USING FINITE STATE MACHINES

BACKGROUND

1. Field of the Invention

The present application is directed to flight control law architectures for unmanned and manned aircraft.

2. Description of Related Art

Conventional aircraft control designs generally include one or more of a feedback gain and logic design which are utilized to switch between control loops with switches and/or buttons. The logic design utilizes the classic logic tree so that the flight control computer (FCC) and vehicle management system (VMS) architecture will be effective for maneuvering flights. An autopilot design will then be implemented by the third party to make aircraft to fly all kinds of hold mode. This design is strictly limited to manned type of the flight control system. Unmanned and optionally manned types of flight cannot be conducted with this kind of design.

A common objective of semi-autonomous operation for the future vertical lift (FVL) of defense vertical take-off and landing aircraft (VTOL) has brought significant attention in recent years. It is believed that a conventional rotorcraft is no longer suitable for the future combat. As such, fly-by-wire (FBW) systems with high performances aircraft characteristics are key features for future defense and commercial VTOL helicopter fleets. For example, it has been found that a blend of manned and unmanned aircraft fleets can perform scout missions more effectively than that of piloted aircraft alone.

Vehicle management systems (VMS) and aircraft control laws (ACLAWS) play important roles in making various flight missions possible. A well designed VMS integrated with flight control computer including advanced flight control laws can simplify the most difficult and complicated tasks. With integration of VMS and flight control computer with control laws, the system should be appreciated that advanced flight control systems incorporate multiple control laws where each control law is tailored towards a particular flight condition. These systems need to respond to multiple forms of control inputs which include control stick, beep and guidance command inputs. These inputs come from either the pilot on-board for piloted aircraft or from a remote operator for Unmanned Aerial Vehicles (UAV).

Such systems also include various automatic modes, for example, waypoint guidance, automatic takeoff and landing, and others. The VMS integrates all these functionalities and subsystems together and receives various inputs such as sensor measurements, control positions, automatic mode selection, and so forth. With conventional systems, these inputs pass through multiple logic trees to determine flight conditions and the intended vehicle mode of operation by using switches or buttons inside the cockpit. The system decides the best control law for these conditions and sends commands to switch to the appropriate control law. When more functionalities and subsystems are added to VMS, the complexities to integrate these together will increase rapidly for future vertical lift. The methodologies to make the new complex systems easily integrated together as a basis for future updates is extremely important to accelerate rapid changes of this powerful autonomous machine.

A number of conventional VMS FCC systems utilize a logic tree architectural, which is restricted to using logic type for internal and external variables. These variables can be assigned only one of the two values: True or False. Sometimes these values are represented by numbers 0 and 1. This method requires using a sophisticated network of “AND”, “OR”, “NOT” logic blocks along with various types of Set-Reset latches. Thus, the conventional systems create a complex logic tree even for a simplistic analysis. Increasing complexity of the logic trees increases the number of internal variables, resulting in significant exhausted time spent during the analysis. Furthermore, the output variables can only turn on or turn off a control law based on their value of true or false, thus requiring at least one output variable for each control law implemented. The number of variables increases, which adds additional test and evaluation burden in the certification phase of the flight control system. Moreover, the increased complexity makes it very difficult to add new subsystems that seamlessly integrate with the existing subsystems.

Therefore, conventional systems that utilize logic tree based systems will increase the burdens on the size of software, software tests, correctly software implementation and generalized software re-use/re-cycle/modularization for the complex vehicle management systems. There is a need for a different approach that can simplify the logic system, reduce number of internal and output variables, and still provide a capability to easily add new functionalities and subsystems without undue modifications to the overall system.

Although the foregoing developments represent great strides in the area of control law systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 shows the schematic integration of the electronic and mechanical devices, avionics system and flight control computer to form the innovative VMS in the aircraft flight control with all associated devices is illustrated;

Figure 2:
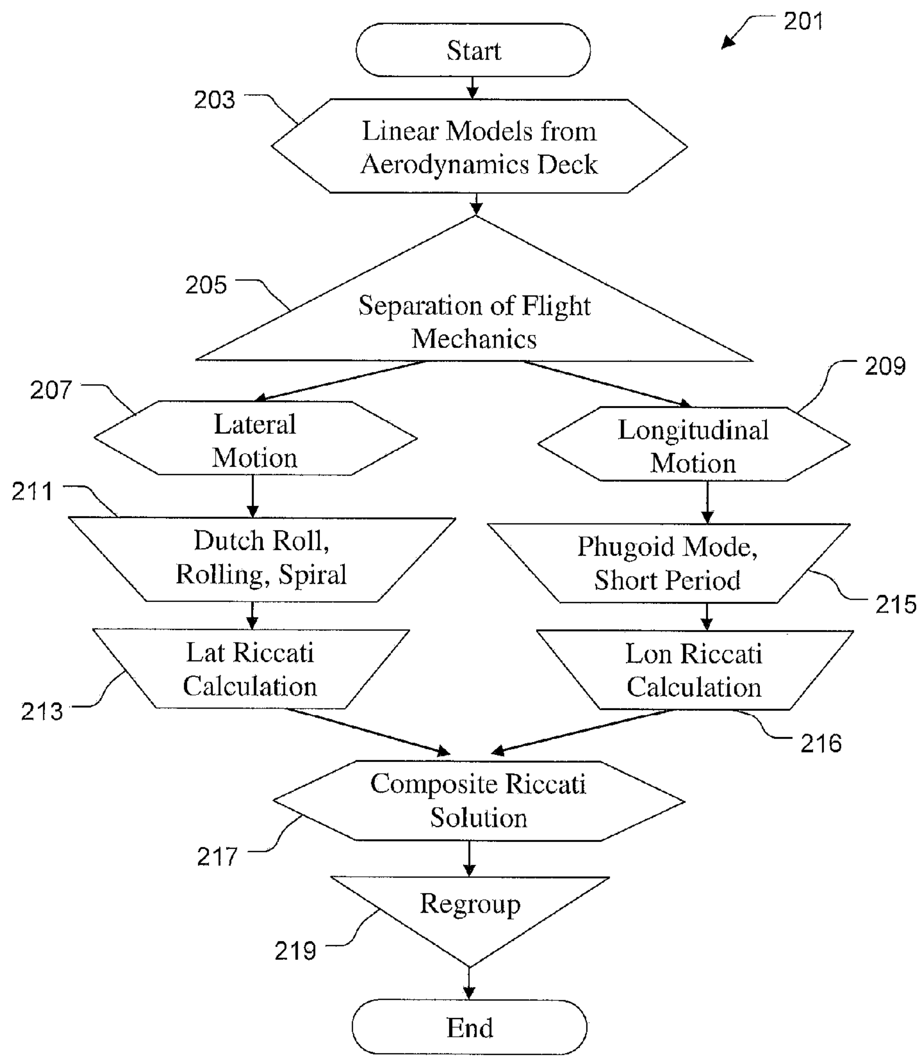
FIG. 2 shows a first inner loop process for model reductions.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment of the present application provides a control law architecture of a blended of Manned/Optionally-Manned/Unmanned Vehicle Management System (M/OM/UM VMS) that incorporates a finite state machine. In general, the vehicle management system comprises of an interface that receives input parameters related to aircraft states, control inputs, and guidance mode selections for manned and unmanned controls. The system implements a modular design where each module is targeted to implement one subsystem or functionality. At least one of these modules implements a finite state machine which selects one state among with a plurality of possible states. The selected state activates the appropriate control law.

In the preferred embodiment, the architecture of the present application for an aircraft M/OM/UM VMS utilizes a finite state machine along preferably incorporating a three loop design control law architecture. The system can be utilized not only with a helicopter, but also along with fixed wing, tilt-rotor, and compound aircraft. However, application of these inventions are not limited in any way to the above mentioned control laws or the aircraft.

As shown in FIG. 1, a simplified schematic of a vehicle management system 101 is shown. The Vehicle Management System 101 includes a flight control computer (FCC) 100 that receives state feedback information from an interface, which includes aircraft sensors 102 and/or control input commands 103, for example, from pilot stick controls, ground inputs, or navigation inputs.

For unmanned aircraft, the control input commands can take the form of either control stick input or navigation state commands like, for example, velocity climb rate. Based on this information, the Vehicle Management System selects the appropriate state of operation among the plurality of possible states.

The selected state from the sensors and/or inputs activates one or more control laws 105, which in turn generates an appropriate control inputs that passes to the aircraft 104 via one or more control actuators 107.

System 101 can be integrated as a limited authority system as well as a full authority system. Moreover, the design of the Vehicle Management System is independent of the downstream control laws; the only constraint being the existence of a corresponding control law for the state selected by the VMS.

A finite state machine 109 includes a plurality of possible states that are connected together by logic conditions. These logic conditions determine the state selection based on values of input parameters, for example, from the sensors and pilot inputs. The logic states are made to represent a control law selection or a mode of operation for the aircraft. These states can be assigned a finite integer number, which unlike conventional logic tree designs can only assign true or false values to its internal and output variables.

The VMS system of the present application can lump together multiple variables in the logic tree design to a single variable in the finite state machine design. This significantly reduces the number of internal and output variables which reduces the time required for Verification and Validation (V & V) and Modified Condition/Decision Coverage (MC/DC) tests in the certification phase of the flight control system.

It should be understood that for the piloted control laws, the specific sequence is followed so as to reduce pilot confusion; whereas, for UAV flight control laws, the innovative state flow logic 109 can switch the aircraft maneuver to any combination of states from, for example, longitudinal, vertical, lateral, and directional state flow machines such that the unmanned aircraft can fly to a certain maneuver which typically is difficult to accomplish by the pilots due to the pilot's mental limit.

The modular design of the system provides seamless integration of different functionalities and subsystems together. It allows the modules to be designed and tested independently outside the system and later integrates with the entire system. Each new functionality or subsystem is added as a new module or as a new state in an existing module, which allows the system to expand easier.

It is contemplated that the preferred embodiment be tailored for seamless and switchless operation for manned, optionally manned, and unmanned flight control systems. The switchless design selects the appropriate mode of operation for the given flight condition for manned, optionally manned and unmanned flight control systems. This feature allows pilot or unmanned flight to focus on the out-of-window cues and mission task element, which in turn reduces the pilot workload. However, the pilot has the authority to switch to the mode of normal operation applicable to the specific flight condition. For the unmanned flight control mode selection, the automatic flight mode selection state machine logic can make any combination of commands such that the optimal flight plan or performance can be achieved. The seamless design feature of the system ensures that the transition from one control law to another does not result in discontinuity in the control law outputs.

An additional feature of the present invention is that the Vehicle Management System architecture is independent of the downstream control laws. In the contemplated embodiment, the VMS system utilizes the three loop design control law concept. However, it will be appreciated that other control law designs could be equally well suited for application of the present invention. When well compiled, the manned, optionally manned and unmanned flight control management systems can be accomplished. The unmanned flight is in no need of following the manned typed of flight concept. Individual mode selection for each axial control can make the entire unmanned flight much more powerful. Aggressive and agile flight of UAV can then be achieved. All other advanced feature such as CAT A, Automatic Autorotation, and optimal flight plan are contemplated in the present application.

The following discussion provides addition details of the present system with reference to the accompanying drawings, in which some, but not all embodiments of the invention are shown. Indeed, these inventions may be embodied in many different forms and should not be construed to the embodiments set forth herein.

Method of Decoupling Using Three Loop Control Laws

Model reduction technology is applied to reach robustness of the 1st inner loop inherited from the three loop control laws design. These features of the model reduction are shown in the accompanying FIGS. 2, 3 and 4.

It will be appreciated that one unique feature believed characteristic of the present application is utilizing the below described process of separating the flight mechanism to individual flight directional motions, then applying analysis to each separated control law prior to regrouping. It should be understood that attempting to analyze each control law without first decoupling is time consuming, resulting in a slower response period. Further detailed description of the preferred embodiment is provided below.

FIG. 2 is an exemplary flowchart 201 that depicts the preferred process to calculate the Riccati solution from the longitudinal and lateral 4×4 linear flight models. The sequence process and computation methods to expand the stability region are represented by a flow chart 201. Block 203 represents the linear models derived from aerodynamics analysis and/or wind tunnel data. Block 205 represents the separation of flight mechanics, for example, separation of the control laws into a lateral control law motion 207 and a longitudinal control law motion 209. It will be appreciated that decoupling the control laws in components, e.g., lateral and longitudinal motions, allows rapid calculation in the single degree of motion. After the decoupling of the control laws into flow paths for longitudinal and lateral components, the lateral motion information passes through dutch roll, rolling, and spiral, represented as block 211. The lateral motion architecture includes calculating the motion via Riccati calculations, as represented as block 213. For the longitudinal motion, the longitudinal information passes through phugoid mode and short period, as represented as block 215 and thereafter is calculated with the longitudinal Riccati calculation, as represented in block 216. Thereafter, the longitudinal motion and the lateral motion is calculated with a composite Riccati solution and thereafter regrouped, as represented in respective blocks 217 and 219.

Figure 3:
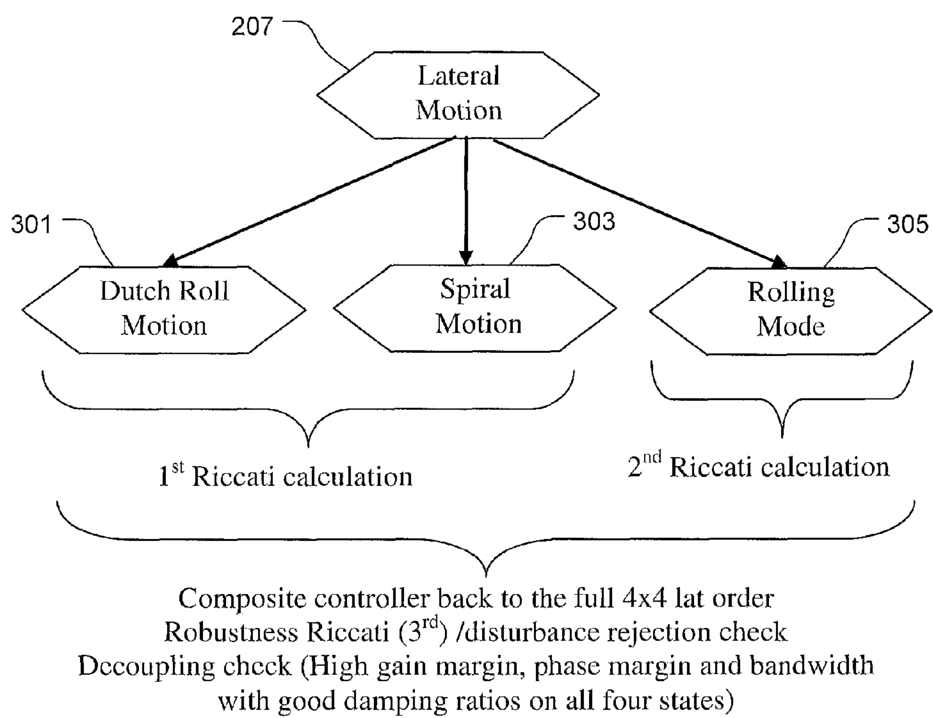
FIG. 3 shows a first inner loop process for lateral Riccati solutions.

FIG. 3 is taken in part from FIG. 2, and shows the lateral model 207 reduced into 3×3 and 1×1 matrices for two subsequent Riccati solutions. As illustrated, a first Riccati calculation is utilized with Dutch Roll motion 301 and Spiral motion 303, while a second Riccati calculation is utilized with the Rolling mode 305.

Figure 4:
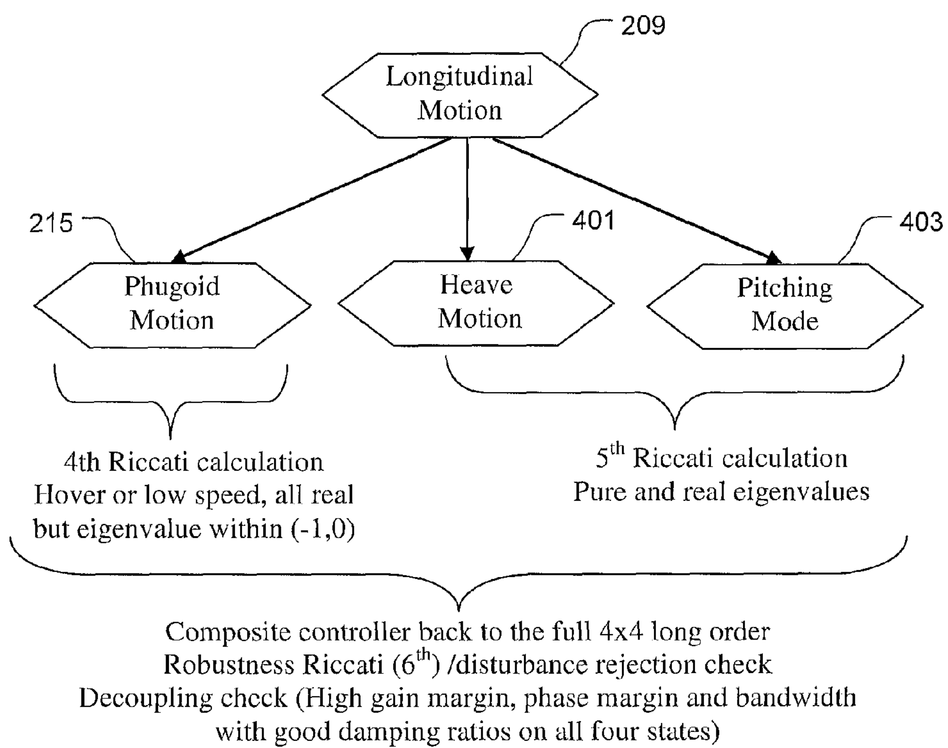
FIG. 4 shows a first inner loop process for longitudinal Riccati solutions.

Longitudinal model reduction with Riccati solutions are shown in FIG. 4. As depicted, the low speed longitudinal motion 209 is employed to show the model reduction calculation. It should be noted that in the low speed longitudinal mode, the eigenvalue can be split into two real values for heave motion 401 and pitching modes 403 from the short period maneuver. To decouple the system similar to the open loop system, it is preferred to maintain the heave mode to be in a heave mode state and short period to be complex conjugate for low speed and high speed using the three loop control laws design. Therefore the longitudinal motion can use model reduction technology to be two 2×2 matrices for Riccati calculations.

Methods of Speed Gain Scheduling

Two gain scheduling methods are preferably utilized in the present application to determine whether a fixed global gain is possible such that the entire aircraft can be stabilized with reasonable actuator responses for all airspeeds. After the above model reduction with robust control inner loop design, some aircraft maneuvers can be controlled by the individual axis. For example, in low speed, the heave mode will be the real eigenvalue. Therefore, it will be pure first order response. Similarly, the Phugoid mode at high airspeed will remain approximately one radian per second away from the short period mode. Therefore, the pure rate response will perform very well for the rate command mode. For pitch attitude hold or the speed hold modes, since the trim follow-up technology is applied, the speed sensor failure mode auto converted to attitude hold will be easy and without transient. For the pedal loop in the low speed, the pure flat turn can be generated so that the heading hold can be easily controlled by the pedal loops. Similarly, the lateral reposition can be easily controlled by the lateral controller with heading hold within ±1 to 2° during maneuvering. At a high speed, the pedal loop control will be switched to turn coordination to help the lateral maneuver, or pure sideslip control if the pure pedal input is applied. For the heading hold in the high speed, the lateral heading hold will be much easier than that of the pedal heading hold. All these functions will be very standard control after decoupling the individual loop control.

The gain scheduling based on airspeed can then be applied to the flight control laws. To make the first inner loop from the robust calculation as close to each other as possible to avoid speed failure gain schedule issue, the uncertainty technology is applied. There are preferably two methods utilized in the present application. The first gain scheduling method, depicted as diagrams 501 and 601, are shown in respective FIGS. 5 and 6. In these two figures, the lateral and longitudinal are integrated together for the entire re-grouping process. Thereafter, the stability margin and bandwidth are calculated. It should be understood that the uncertainties of the system during this process can be assumed to be from: 1. the speed difference; 2. the center of gravity (CG) difference; and 3. the altitude difference. Other factors are also contemplated, but not listed.

Figure 5:
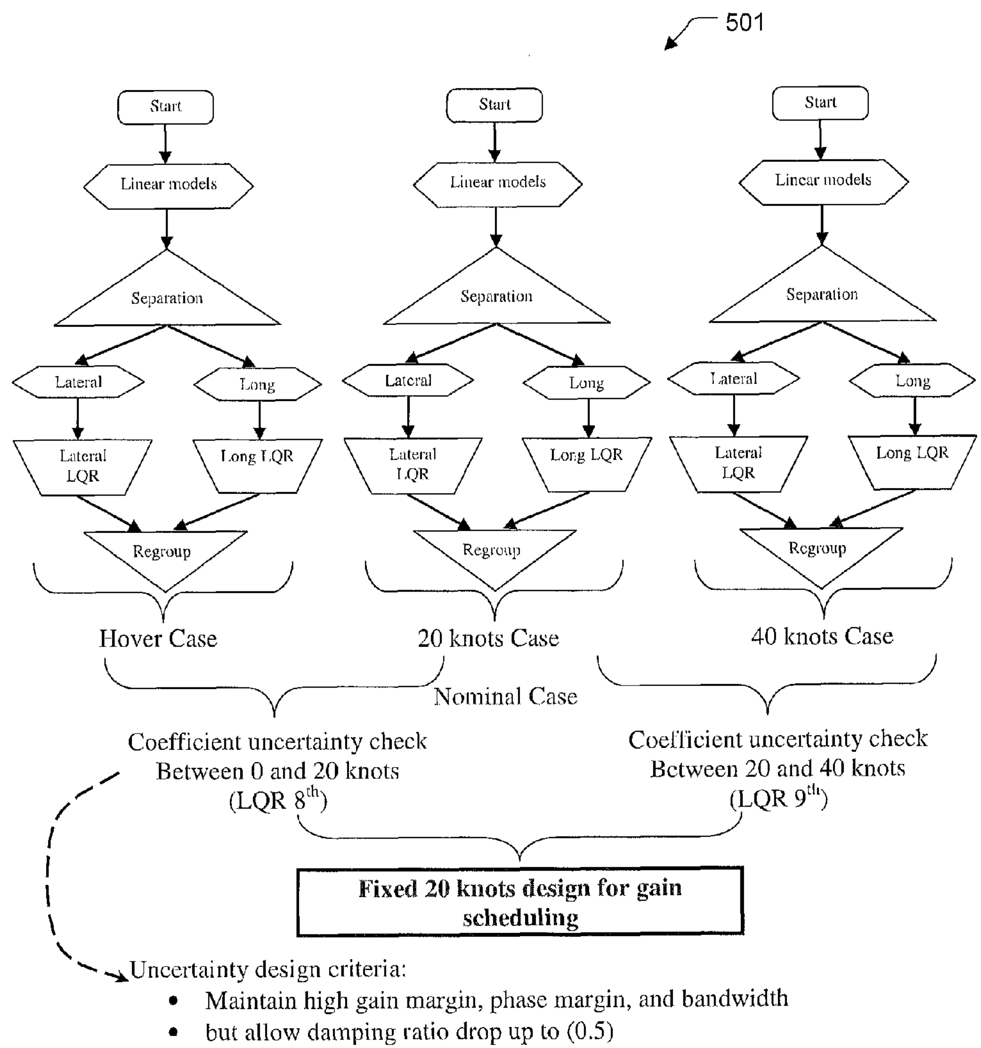
FIG. 5 shows integration of a lateral and longitudinal with gain scheduling for 20 knots.
Figure 6:
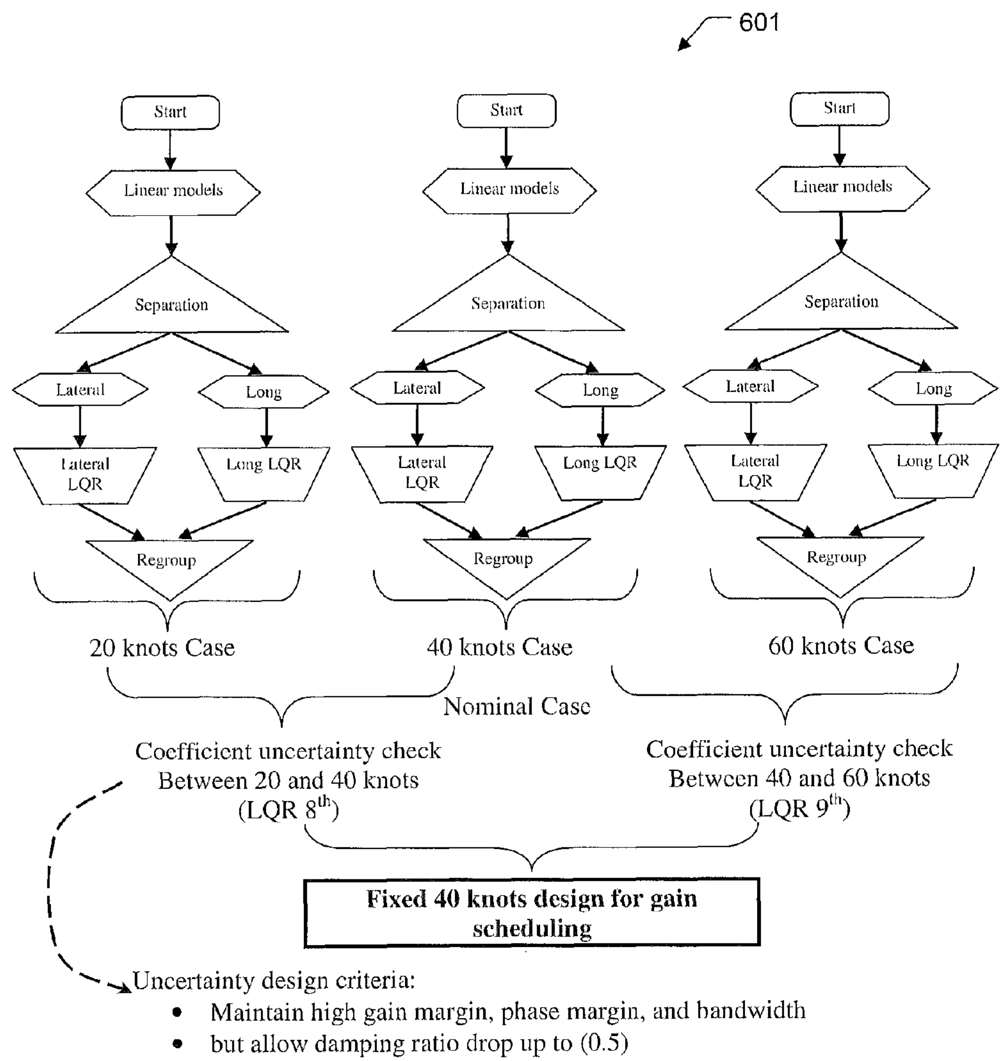
FIG. 6 shows integration of lateral and longitudinal with gain scheduling for 40 knots.

In FIGS. 5 and 6, the airspeed, for example, hover, 20, 40, and 60 knots, is used as an example of how to compute the uncertainties. In the preferred process, the airspeed is first selected as an uncertainty, then the CG, and finally the altitude density. With robust calculations from the three loop method, the entire uncertainties can be easily determined and the individual inner loop determination can then be obtained.

In both FIGS. 5 and 6, the process of stabilizing the linear models are utilized during the hovering mode and during various speed scenarios. After the full aircraft linear model is decoupled into lateral and longitudinal components of motion, the effect of coupling terms between lateral and longitudinal motions can be reduced to minimum, while applying an improved linear quadratic regulator (LQR) to stabilize the system. Thereafter, the lateral and longitudinal motions are regrouped and the process of gain scheduling is utilized. This process is illustrated in the diagrams for each airspeed.

Figure 7:
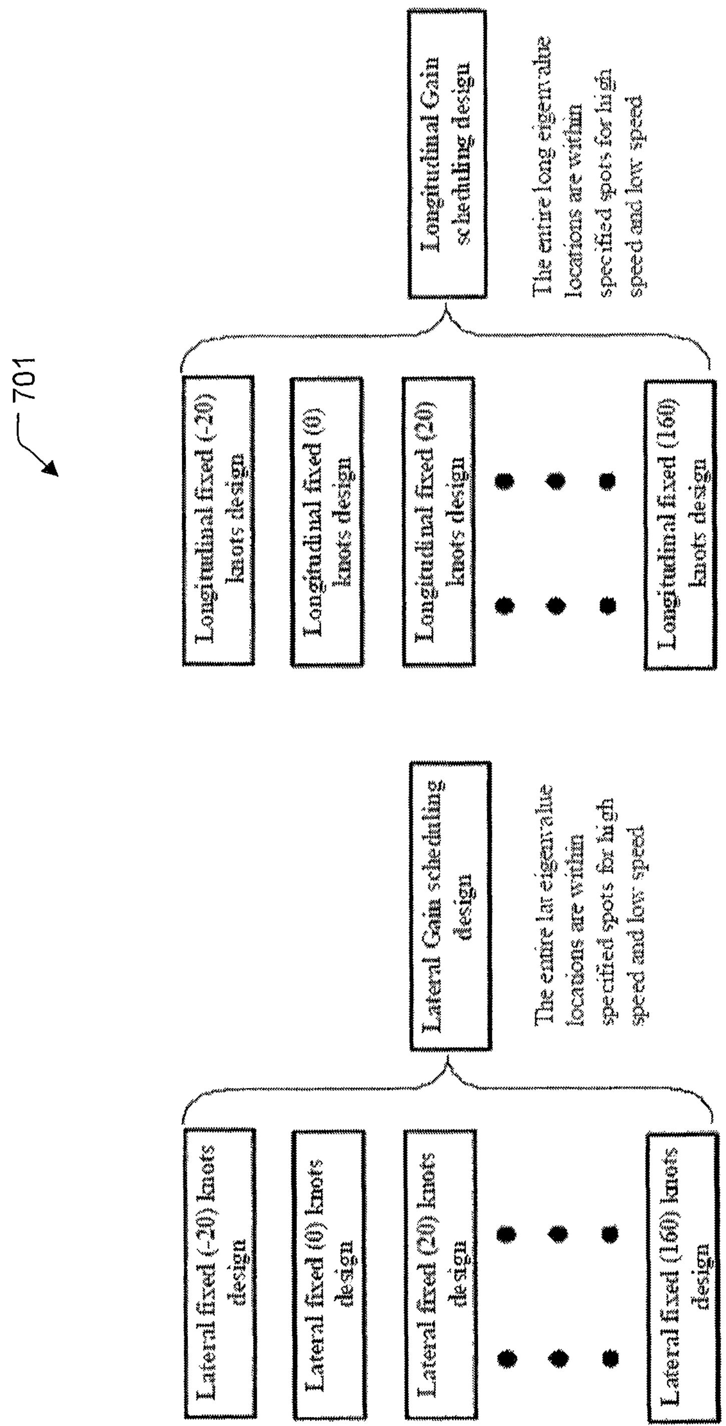
FIG. 7 shows individual lateral and longitudinal gain scheduling method.

The second gain schedule process is shown as diagram 701 in FIG. 7. The lateral and longitudinal gain schedule is independent of the full linear model during gain scheduling design. Later, all gain sets will be checked with respect to the full linear models.

It should be noted that the best design is to set the gain schedule value within 10% difference such that the airspeed sensor failure mode can be designed to one gain set only. The above two methods with robust gain schedule design will help the control laws design resulting in one main gain set such that all linear models after constant gain set feedback are all within certain tolerance of gain margin, phase margin and disturbance rejection requirements. All others gain scheduling sets will then become minor adjustments from this main set. Therefore, when airspeed scheduling method cannot be used due to airspeed sensor failures or faults, the main gain set can still be used for the degraded mode. The entire control laws design will only lose a little of stability and control requirements.

Manned/Optionally Manned (OM) and Unmanned Management

Figure 8:
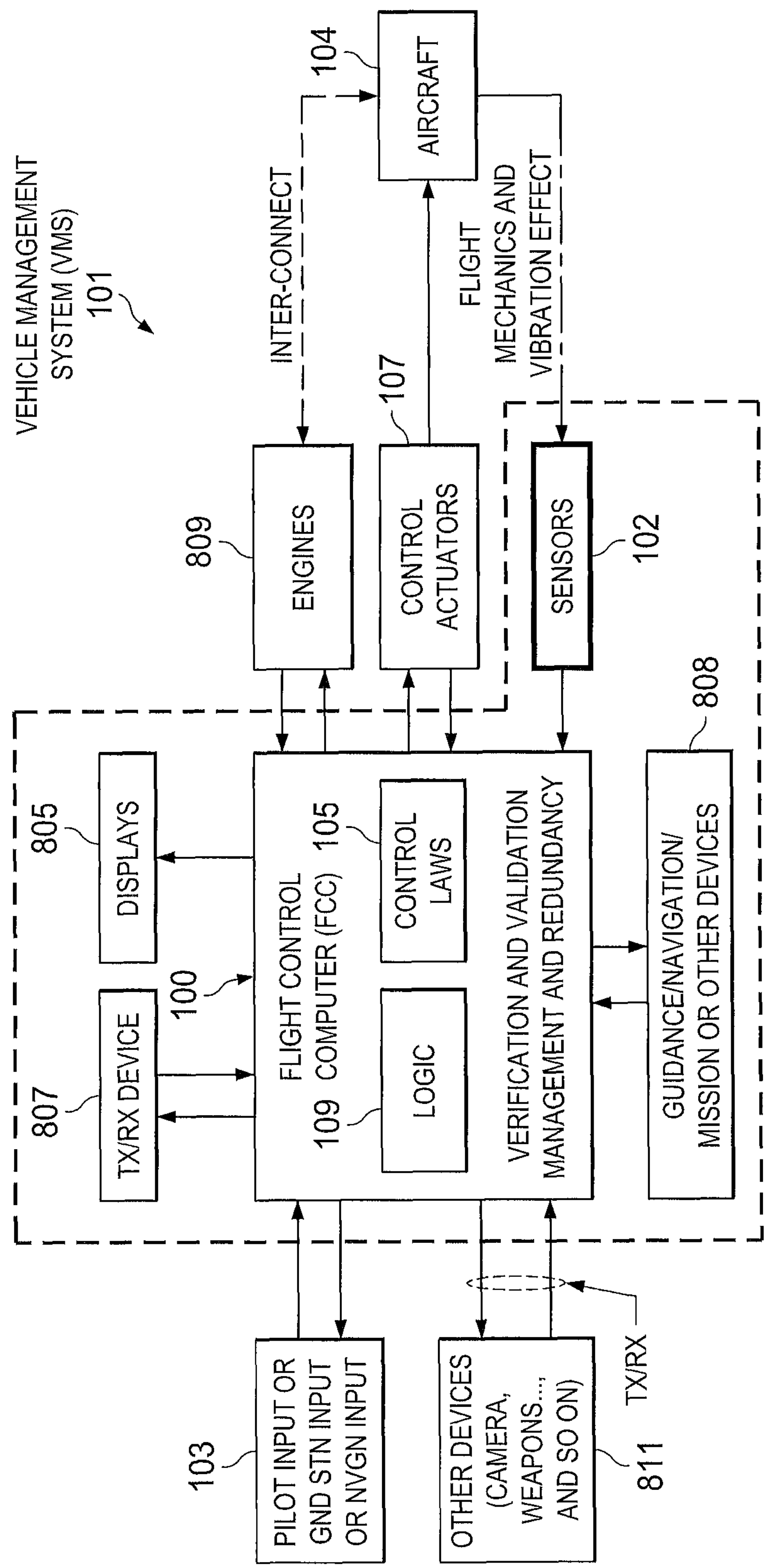
FIG. 8 shows schematics integration of a vehicle flight management system.

The control law architecture of the manned/optionally manned and unmanned vehicle management system is controlled by the flight control computers, which receive and transmit various signals from their interface devices via wires or wireless connections. The VMS system 101 is shown again in FIG. 8, which depicts that the manned/optionally manned/unmanned flight control computer 100 connects to both manned and unmanned devices associated with the aircraft 104. Therefore, it is contemplated that the standard avionics device for the piloted aircraft to be installed inside the aircraft. The displays 805 can be illustrated as PFD, MFD, the engine indication display, and so on. These displays are for the piloted flight operations.

For the unmanned flight maneuver, the wireless function is shown as TX/RX device 807. It should be noted that block 807 indicates that both wired and/or wireless connections are included. The ground control stations can then control the aircraft through wireless signals using the ground stick functions of the navigation functions. The wireless channels in TX/RX device are not limited to one frequency. Multi-frequencies are considered in this application. For example, the frequency of ground flight control uses one wireless channel, which is independent of the wireless channel for the video transmission to the ground station. If this transmission bandwidth is not high enough on the FCC, the mission computer or other devices can be used to achieve the desired outcome. In the preferred embodiment, this function is reserved on the block diagram of Guidance/Navigation/Mission and Other device, as indicated by block 808.

However, for manned/optionally manned and unmanned vehicle management system, the control of the aircraft must be capable of entering from either the piloted input inside the aircraft for manned flight control, or wireless inputs from the ground station for unmanned flight control. The optionally unmanned function can be designed using the following methods: 1. A switch inside the cockpit for manual switch manned or unmanned; 2. Devices to check the pilot consciousness such as impulse sensor installed on the pilot hand or eye contact sensor; and 3. The stick detent logic with sensors and flight plan.

For Method 3, the ground station can take control of the aircraft if the pilot is not responsive after contact. However, the manual stick in the cockpit can avert this logic. All four stick detent positions are the keys to making the aircraft either manned or unmanned in Method 3.

Figure 16:
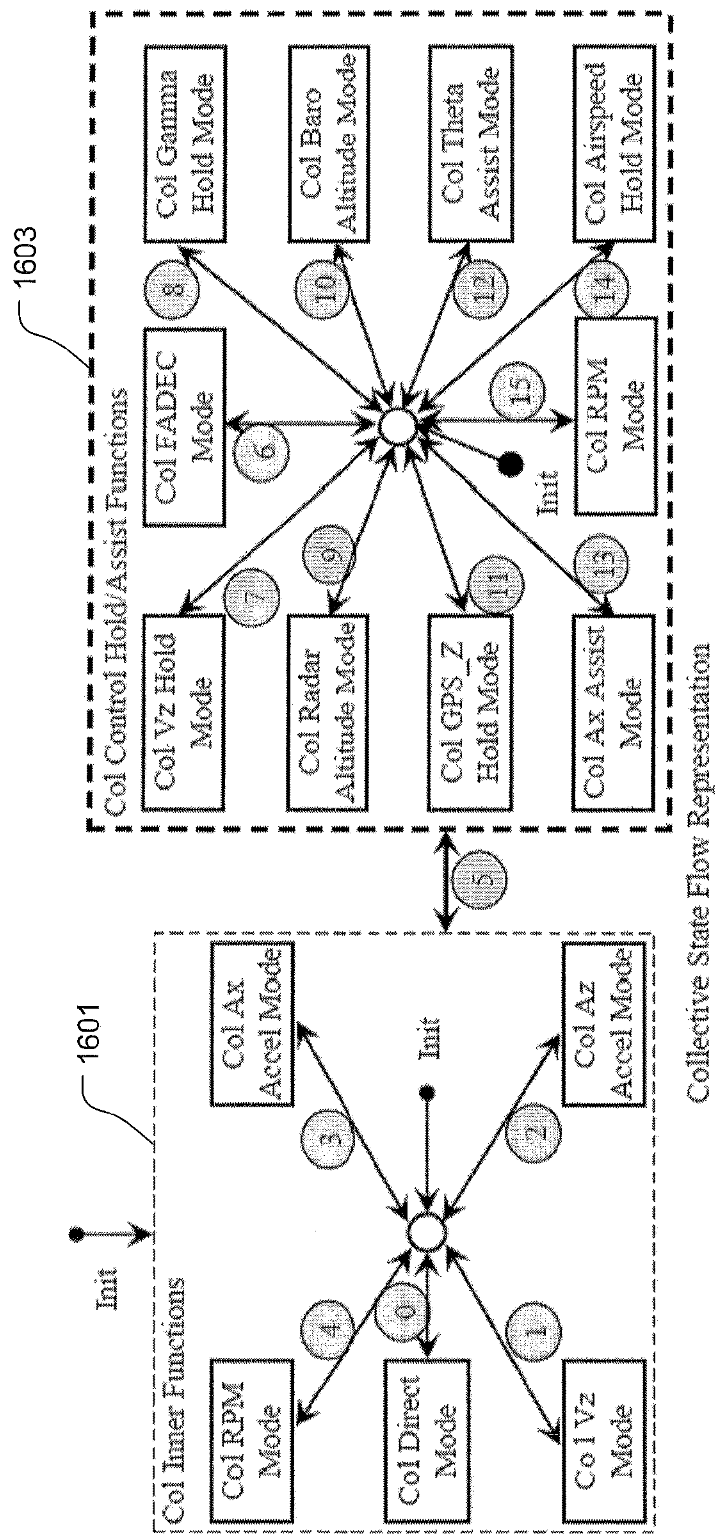
FIG. 16 shows collective mode selection finite state machine.
Figure 17:
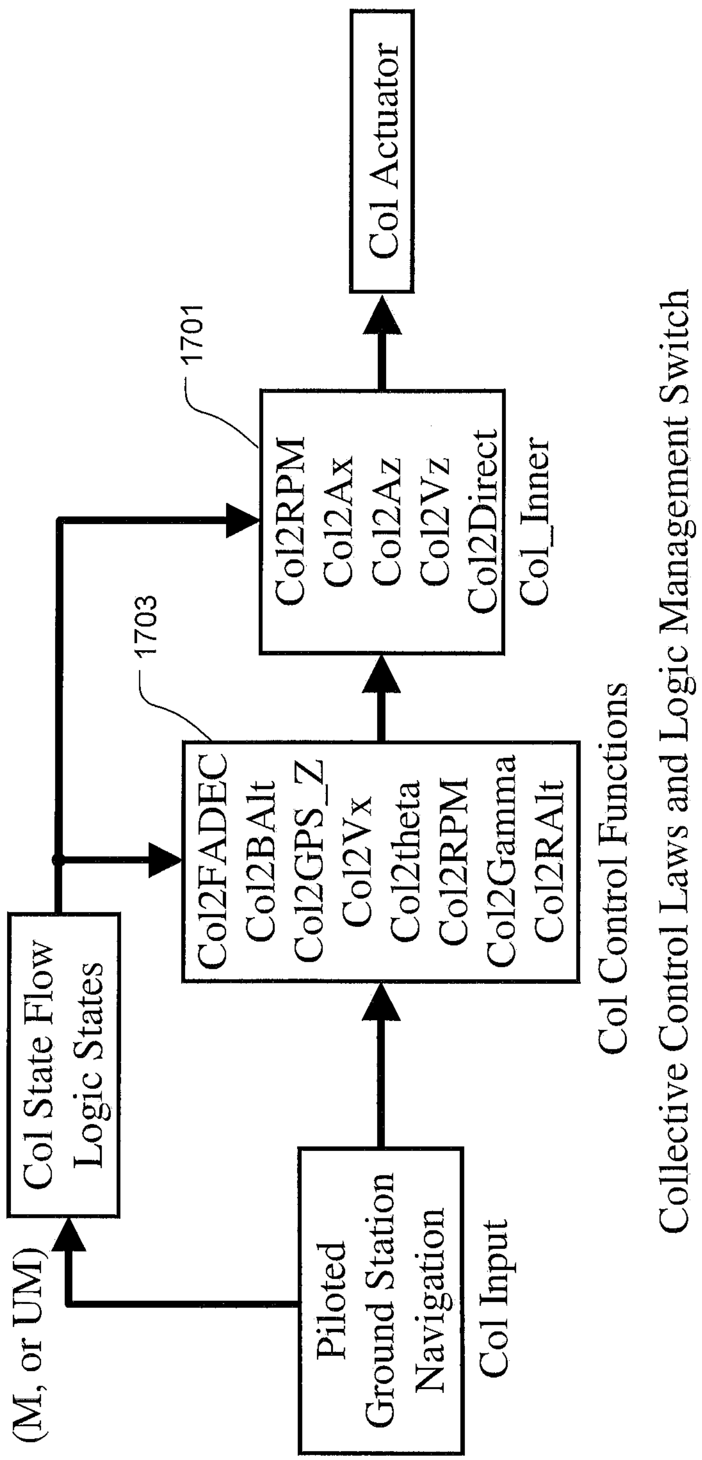
FIG. 17 shows collective control loop with logic states.

The architecture of manned, optionally manned and unmanned vehicle management system also contains the TX/RX function for engine control 809. This link will allow the FCC to control or adjust engine functions such as engine rotation per minute. This link will also enhance the quickness of entering autorotation or single engine failure recover system (also called CAT A) if single or dual engines fail. The signals of (engine N1 and N2) and (engine fail, fault, fire associated message) can help to consolidate the single engine or multi engine failure control logic design with its associated state machine. Therefore, the state flow design on the collective state machine must include these functions, as are shown in FIGS. 16 and 17.

The architecture of manned/OM and UAV FCC also contain a connection to camera, weapons and other devices 811. Depending on application of the aircraft, the desired manned/OM/UM VMS can be employed for commercial and military application. In fact, the architecture of this M/OM/UM VMS will also allow the FCC during UM maneuver taking the control command signal for weapon targeting or taking the video command for target tracking. The reasons of mentioning these functions is to illustrate that the decoupling from flight mechanics and individual state flow logic design will make UM maneuvers and functions different from the manned flight control system. These functions are contemplated in the present control architecture.

Individual State Machine Management

Figure 9:
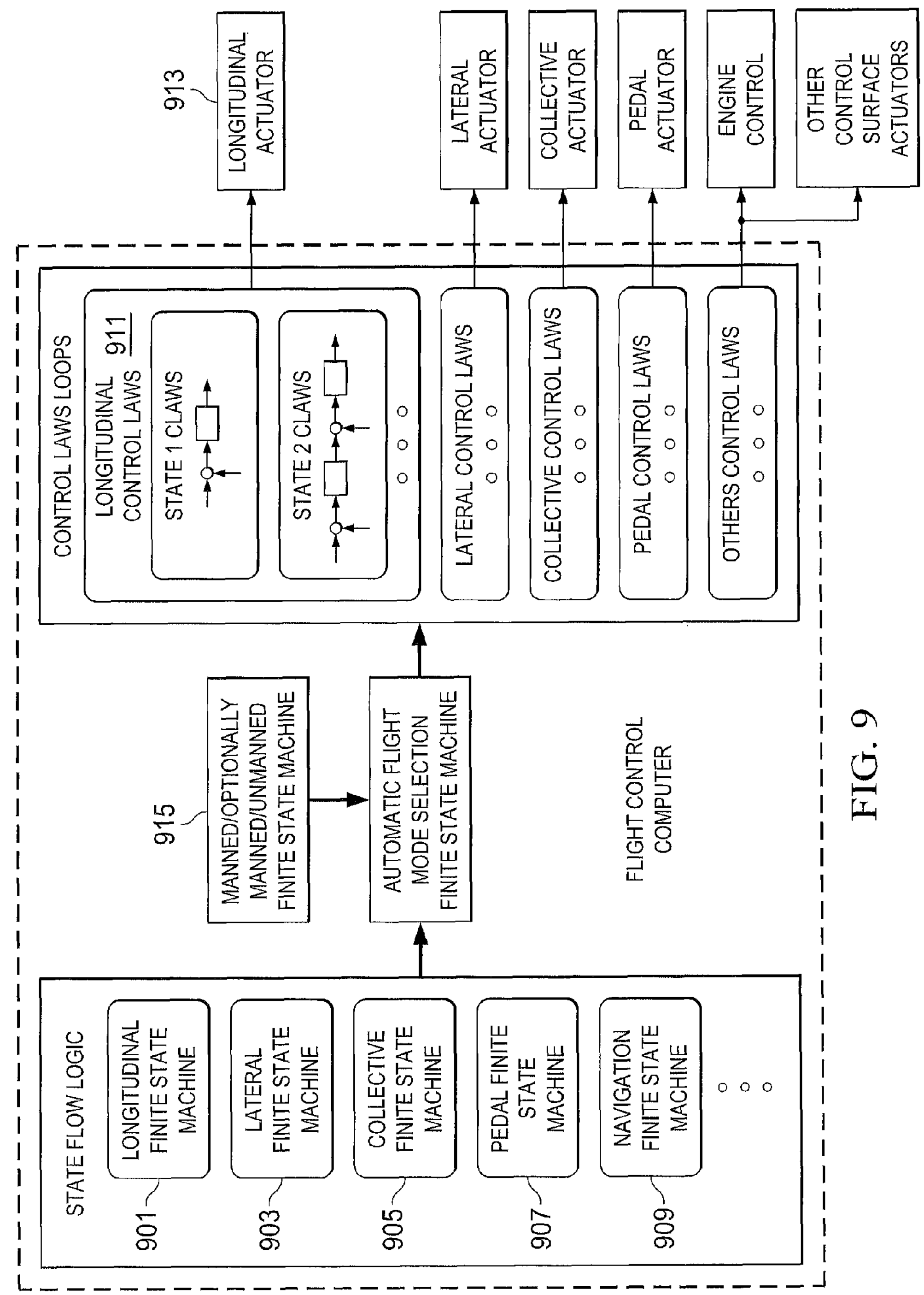
FIG. 9 shows schematic of the FCC state selection and activation of corresponding control laws.

FIG. 9 provides illustration of the FCC 100 of the VMS 101, and depicts the interaction between VMS and the control laws. State flow logic 109 preferably consists of the following state machines: Longitudinal Finite State Machine 901; Lateral Finite State Machine 903; Collective Finite State Machine 905; Pedal Finite State Machine 907; Navigation Mode Finite State Machine 909; and, Other Finite State Machines (not shown).

Figure 10:
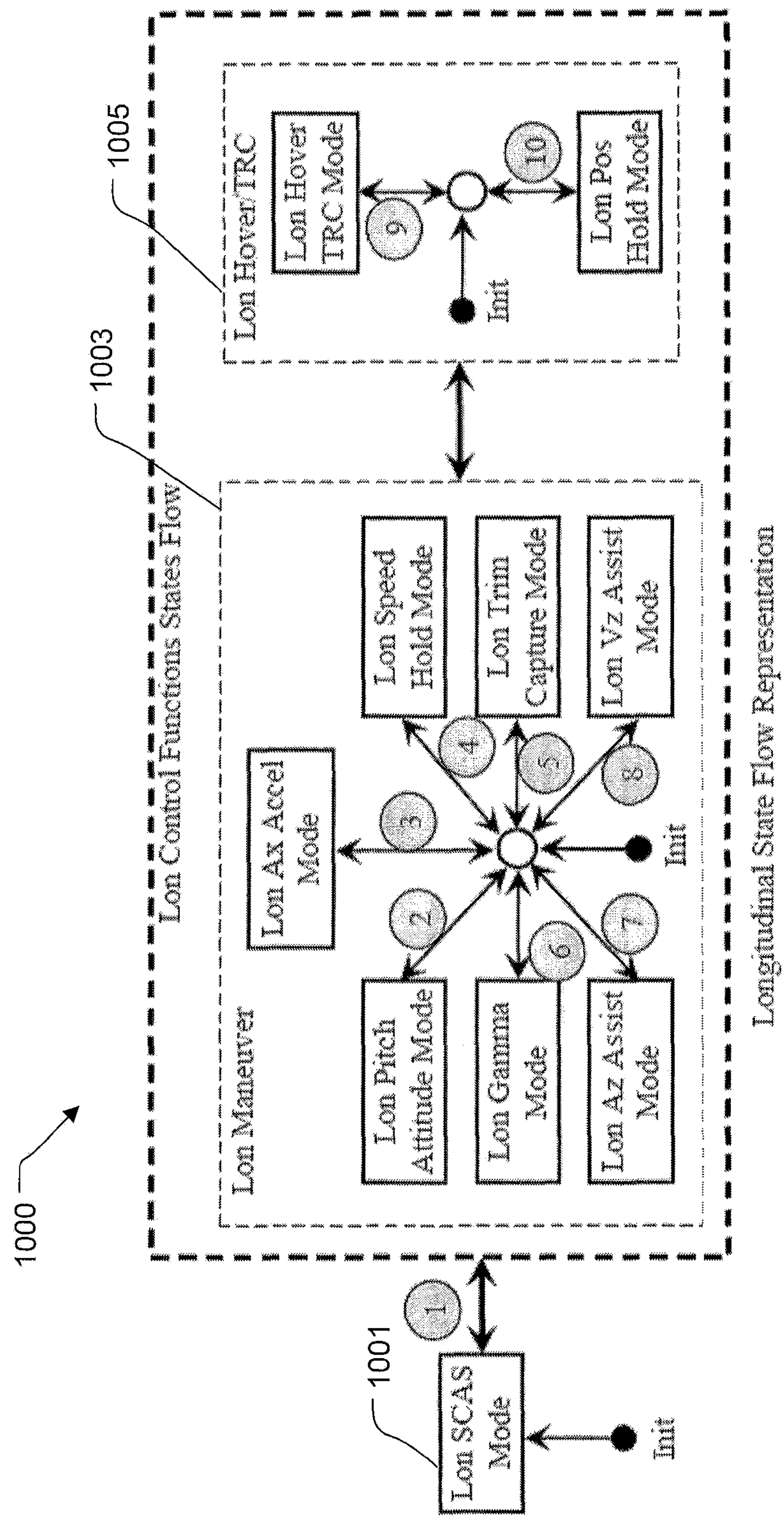
FIG. 10 shows pedal control loop with logic states.

The lines connecting the states in the Longitudinal State Machine module, as shown in FIGS. 9 and 10, represent the transitions from one state to another. For example, the output of the longitudinal selected control law 911 is passed to the longitudinal control actuators 913 with its associated control surface if multi-controllers are used for longitudinal control design. These control surfaces can be, for example, elevators or horizontal stabilizer for the airplane. It is also contemplated that each of these modules also encompass sub-modules.

The manned, optionally manned and unmanned management are controlled by the M/OM/UM finite state machine 915. This state machine with state flow logic group will then work as inputs for automatic mode selection finite state machine for the control laws loops to determine individual control laws to be turn on or off. The outputs of the control laws loops are used to control the associated actuators to make aircraft either coupled or decoupled flights. The individual control state machine and loop design are discussed in the following disclosure.

Longitudinal State Machine

The figure describing the finite state machine approach for the Longitudinal Module is shown in FIG. 10. This longitudinal state machine module in FIG. 10 shows ten states, as indicated by circled numerical values, which in turn each of these states having an associated control laws loop. It should be noted that all longitudinal states are included in this design. However, some of these states may not be used for the manned type of flight control, which means it is reserved for the unmanned functions.

Figure 11:
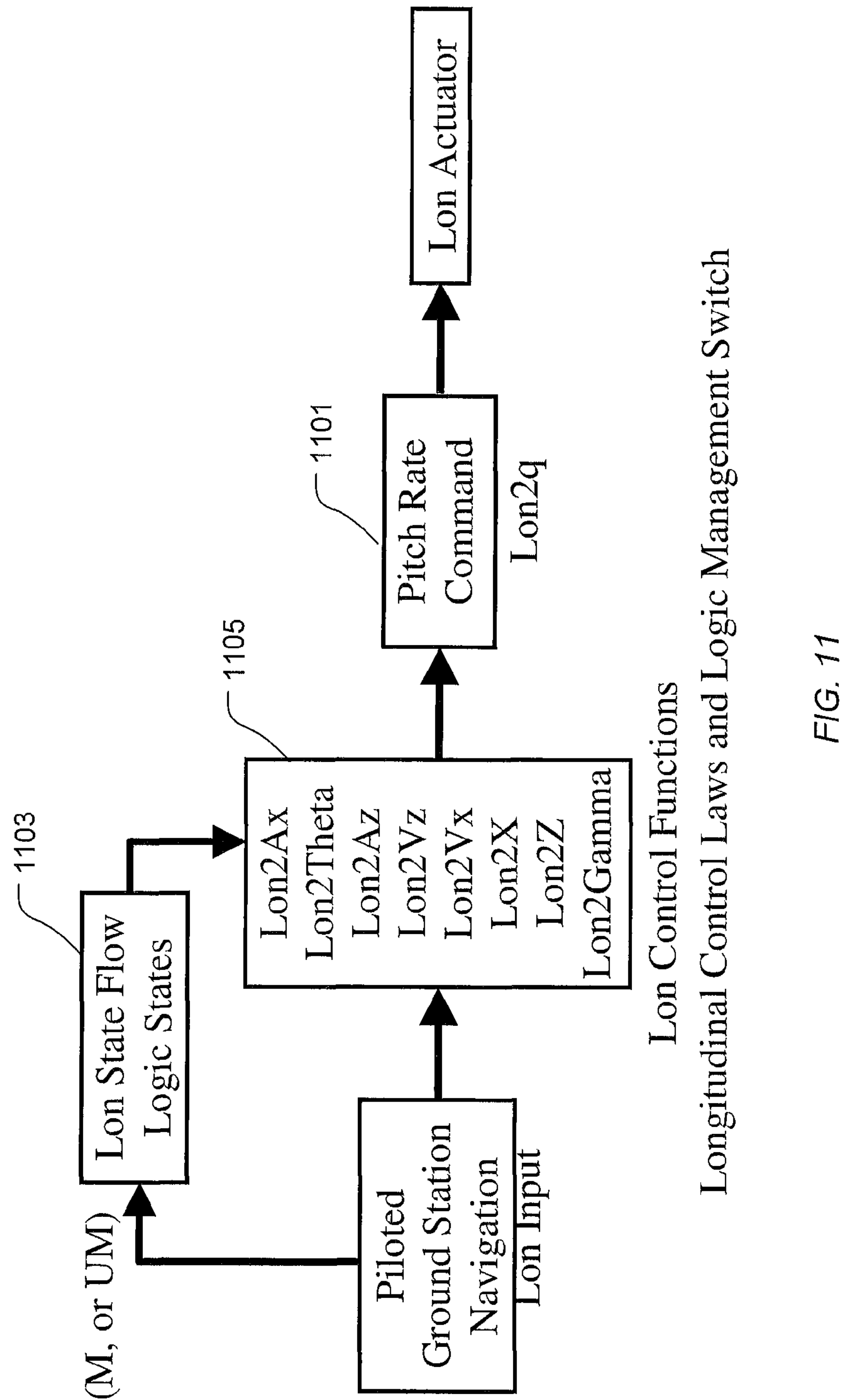
FIG. 11 shows longitudinal control loop with logic states.

The State 1 called Lon SCAS Mode 1001 activates a single feedback loop called the pitch rate command mode. As shown in FIG. 11, Lon2q 1101 is the associated inner loop for this feedback system of the state number. From FIG. 10, the longitudinal state machine will generate the Lon State 1103 integrator number from (1, 2, . . . , 10). The Lon State 2-8 are illustrated in box 1003.

In the contemplated embodiment, the Lon State "2" activates two feedback loop control law shown as Lon2Theta in box 1105, which corresponds to the pitch attitude mode. The Lon State "3" activates the longitudinal acceleration command mode shown as Lon2Ax in box 1105. The Lon State "4" has three feedback loop control law which will make the longitudinal speed hold defined as Lon2Vx in box 1105.

For the piloted mode, when the longitudinal stick is out of detent in the maneuver mode, the aircraft can be set to be either the longitudinal acceleration command or pitch angle command mode. When the longitudinal stick returns to the detent position, the flight control state machine will use the state flow logic back to its close trim position first (called Lon Trim Capture Mode; Lon State "5") and then return to either speed hold (Lon2Vx; Lon State "4") or attitude hold from Lon State "2" Lon2Theta, all shown in box 1105.

Note that Lon Trim Capture Mode on Lon State "5" is a transit mode to make the aircraft return to its pitch trim angle close to its airspeed instead of the zero pitch angle. This design will help the aircraft avoid the longitudinal axis oscillation due to the stick quickly on/off operation.

In the contemplated embodiment, the architecture of M/OM/UM VMS is reserved for aircraft of VTOL, fixed wing, tilt-rotor, and compound aircrafts. The fixed wing function is shown in Lon State ("6", "7" and "8"). Lon State "6" is called Lon2Gamma which is to use the pitch angle to control the aircraft climb angle, gamma. The entire design will depend on airspeed or attitude logic and sensor availability. Logic of Lon Stat "7" is for the quick airplane maneuver mode called longitudinal Az or Nz control. Lon State "8" can be steady state climbing/descending rate flight. The Lon States "6" and "8" can also be used in automatic longitudinal airplane landing function. Its associated collective function is col2Ax and Col2Vx, which will be discussed later. Combination of the (Lon State "1" to "5") and (Lon State "6", "7" and "8") can be combined for use with a hybrid aircraft like the V-22, 609, tilt-rotor, tilt-wing, tail-sitter, X2 and X3 for higher airspeed mode. Therefore, the longitudinal state machine can make the aircraft of VTOL or airplane and hybrid aircraft to be seamlessly and switchlessly operated for manned and unmanned flight.

Finally, the Lon State "9" and "10" in box 1005 are for pure helicopter mode in very low speed region for longitudinal control. Its associated parameter in lateral axis is lateral TRC, hover, and position hold mode. A VTOL aircraft can be designed such that it can automatically return to hover and then position hold from any airspeeds and any conditions within flight envelope. The TRC mode is defined, when the pilot moves the cyclic stick within a certain travel, the VTOL can fly each 0.1 inch of stick per one knot of the ground speed laterally and longitudinally, respectively. Moving cyclic stick out of this travel area, the aircraft can automatically switch to either attitude command or acceleration command or rate command, depending on Lon/Lat State number in the design. Usually, this TRC region is within ±5 to 10 knots circle region. This definition is for the manned type of flight control.

For the unmanned TRC flight control system, this region can be extended to the ±35 knots circle region. By extending this region larger, the aircraft can be used in the criminal chase function and shipboard landing very easily.

Lateral State Machine

Figure 12:
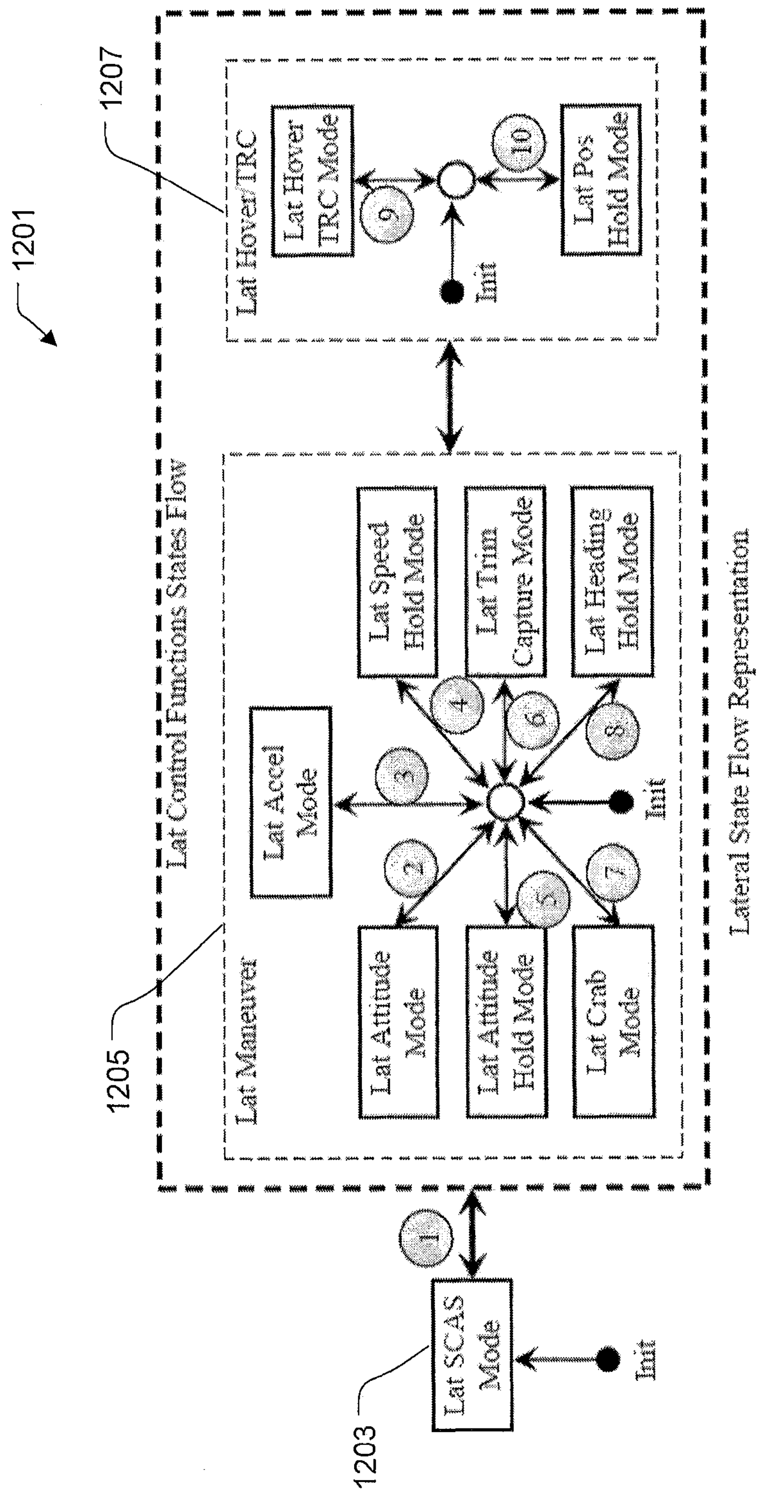
FIG. 12 shows lateral mode selection finite state machine.

FIG. 12 illustrates the finite state machine approach for Lateral Module 1201. Similar to the longitudinal state machine module 1000 in FIG. 10, ten states are reserved in the lateral state machine. The first state is shown in box 1203, states 2-8 are depicted in box 1205, and the last two states 9 and 10 are depicted in box 1207. Note that each of these states has an associated control laws loop to maneuver the lateral motion or hold the lateral maneuvers. Some of these states may not be used for the manned type of flight control only. This implies that most of states are reserved for the unmanned functions.

Figure 13:
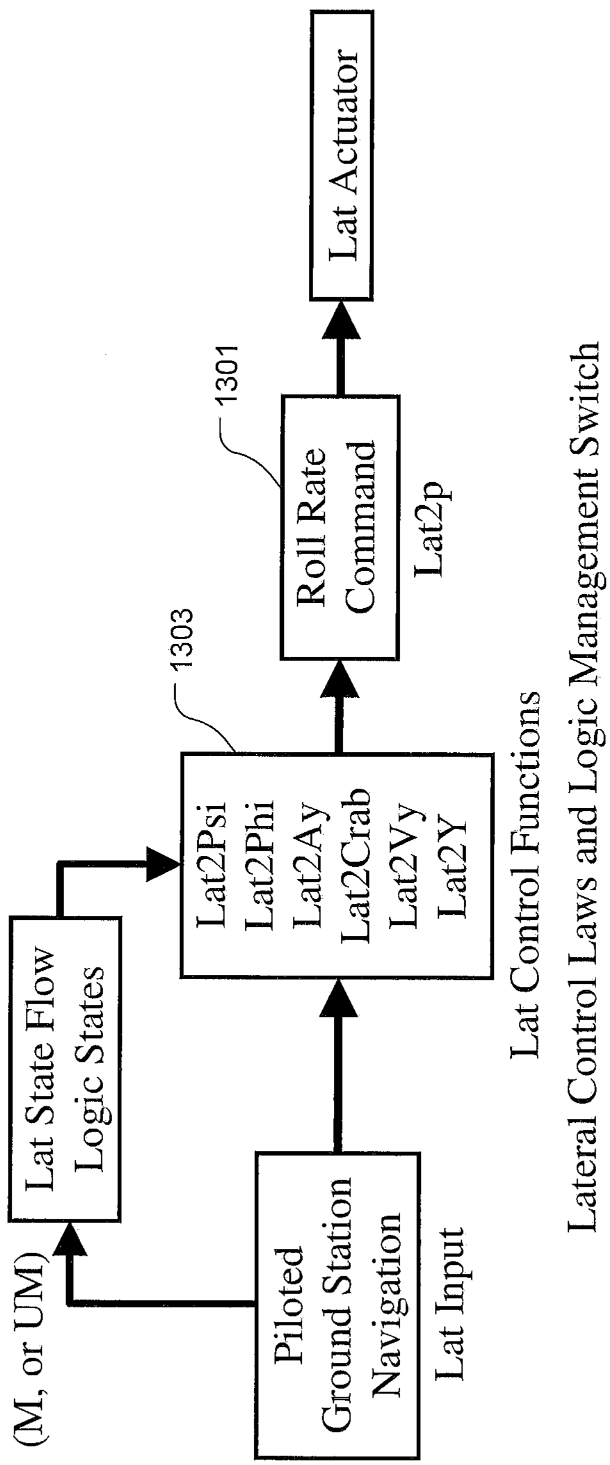
FIG. 13 shows lateral control loop with logic states.

The Lat State "1" called Lat SCAS Mode activates a single feedback loop called the roll rate command mode. The related control laws for all loops are shown in FIG. 13. Lat2p 1301 uses the Lat State "1" logic from Lateral State Machine to enter and exit the control laws. Lat2p loop may contain the pure rate feedback control only or attitude or pseudo attitude concept to improve aircraft controllability and stability. From FIG. 12, the lateral state machine will generate the Lat State integrator number from (1, 2, . . . , 10). Each number will have the associated control laws loop to make the entire flight as desired.

Similar to the longitudinal state machine and control laws, the lateral state machine and control laws also contain ten state numbers. The difference between these two state flow and control law designs are that on the lateral loop, there is one more state number for the specific function of the VTOL which is called Lat2Crab, as shown in box 1303. Lat2Crab is to make the VTOL crab angle hold during approach or landing to make vision awareness better. Crab angle is preferably defined as:

$$\text{Crab\_Angle} = \tan^{-1}\left(\frac{V_y^{earth}}{V_x^{earth}}\right)$$

Note that the body velocity in fore/aft (x) and lateral (y) directions must be converted to the earth axial velocity to accomplish crab angle hold flight.

The Lat State "2" activates two feedback loop control law shown as Lat2Phi in FIG. 13, which corresponds to the roll attitude mode. The Lat State "3" activates the lateral acceleration command mode shown as Lat2Ay in FIG. 13. The Lat State "4" has three feedback loop control law which will make the lateral speed hold defined as Lat2Vy. Usually Lat2Vy loop will be activated only in the slow speed region. In the high speed, sideward velocity is controlled by the pedal loop. For the mid speed, sideward velocity can be controlled either by lateral or pedal controller depending on the turn coordination function on/off region. For the piloted mode, when the lateral stick is out of detent in the maneuver mode, the aircraft can be set to be either the lateral acceleration command or roll angle command mode. When the lateral stick returns to the detent position, the flight control state machine will use the state flow logic back to its close trim position first (called Lat Trim Capture Mode; Lat State "6") and then return to either speed hold (Lat2Vy; Lat State "4") or attitude hold (Lat2Phi; Lon State "5") depending on airspeed or attitude logic and sensor availability. Note that lat Trim Capture Mode is a transit mode to make the aircraft return to its roll trim angle close to its sideward speed equal to or close to zero instead of the zero roll angle. This design will help aircraft avoid the lateral axis with big sideward speed due to the stick quickly on/off operation with and without turn coordination. Note that each associate control laws loop on/off is also illustrated in the left hand side of FIG. 13 for the lateral control laws.

The architecture of M/OM/UM VMS is reserved for aircraft of VTOL, fixed wing and tilt-rotor, and compound rotorcraft. The fixed wing functions on the lateral control laws are similar to VTOL, controlled by Lat State "1", "2", "5" and "8". In fact, lateral integrator numbers of (1, 2 and 5) can be dual used for low and medium, and high speed control of VOTL.

Finally, the Lat State "9" and "10" are for pure helicopter functions in very low speed region for lateral control. Its associated parameters in the longitudinal axis should work as a pair for TRC, hover, and position hold mode. A VTOL can be designed such that the VTOL can automatically return to hover and then position hold from any airspeeds and any conditions within flight envelope. The TRC mode is defined, when the pilot moves the cyclic stick within a certain travel, the VTOL can fly each 0.1 inch of stick per one knots of the ground speed laterally and longitudinally, respectively. Moving cyclic stick out of this travel area, the aircraft can automatically switch to either attitude command or acceleration command or rate command, depending on Lon/Lat State number in the design. Usually, this TRC region is within ±5 to 10 knots circle region. This definition is for the manned type of flight control.

For the unmanned TRC flight control system, this region can be extended to the ±35 knots circle region. By extending this region larger, the aircraft can be used to the criminal chase function and shipboard landing very easily. Therefore, capabilities of performing these two functions are reserved in this patent application.

Pedal State Machine

Figure 14:
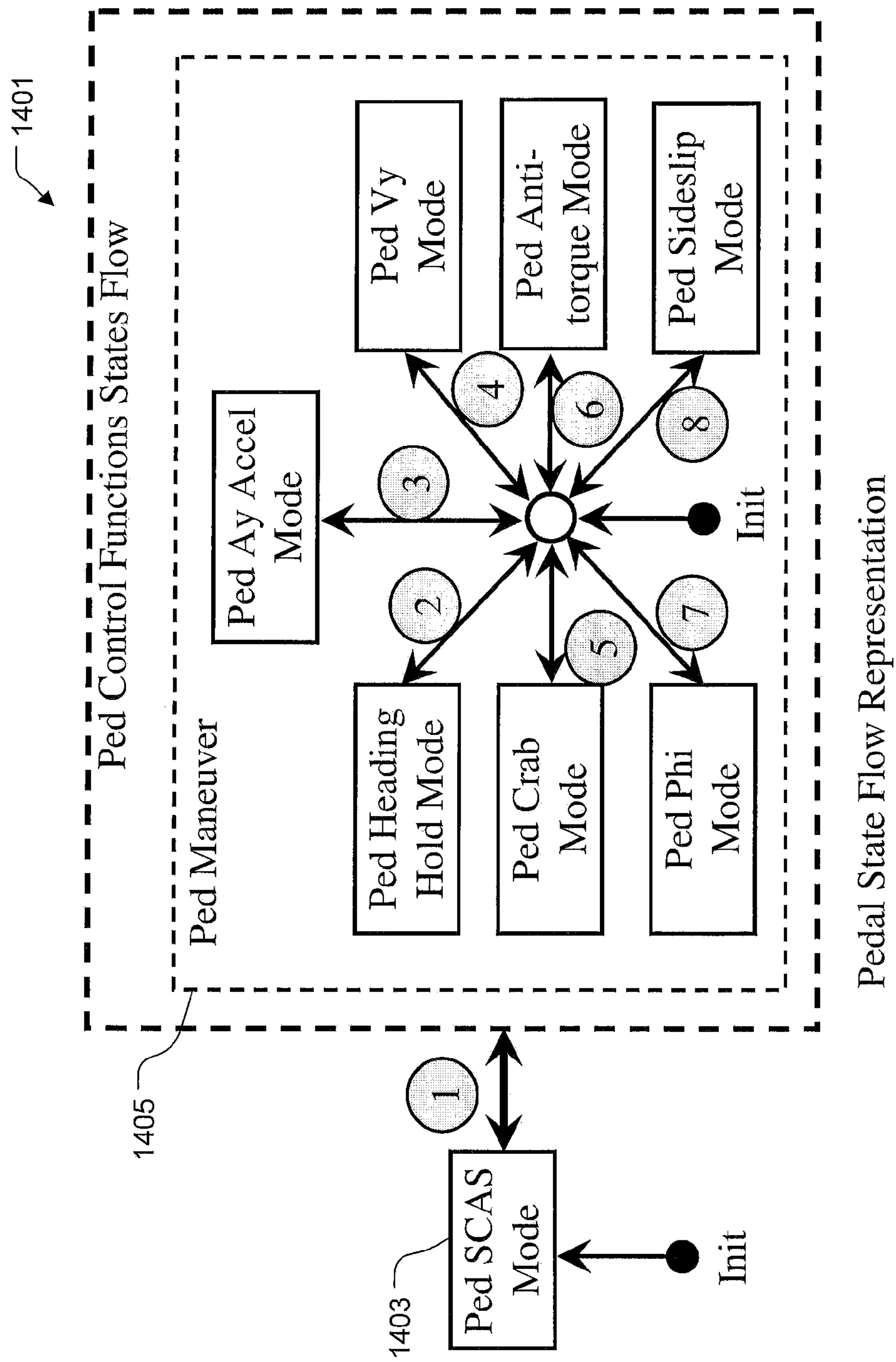
FIG. 14 shows pedal mode selection finite state machine.
Figure 15:
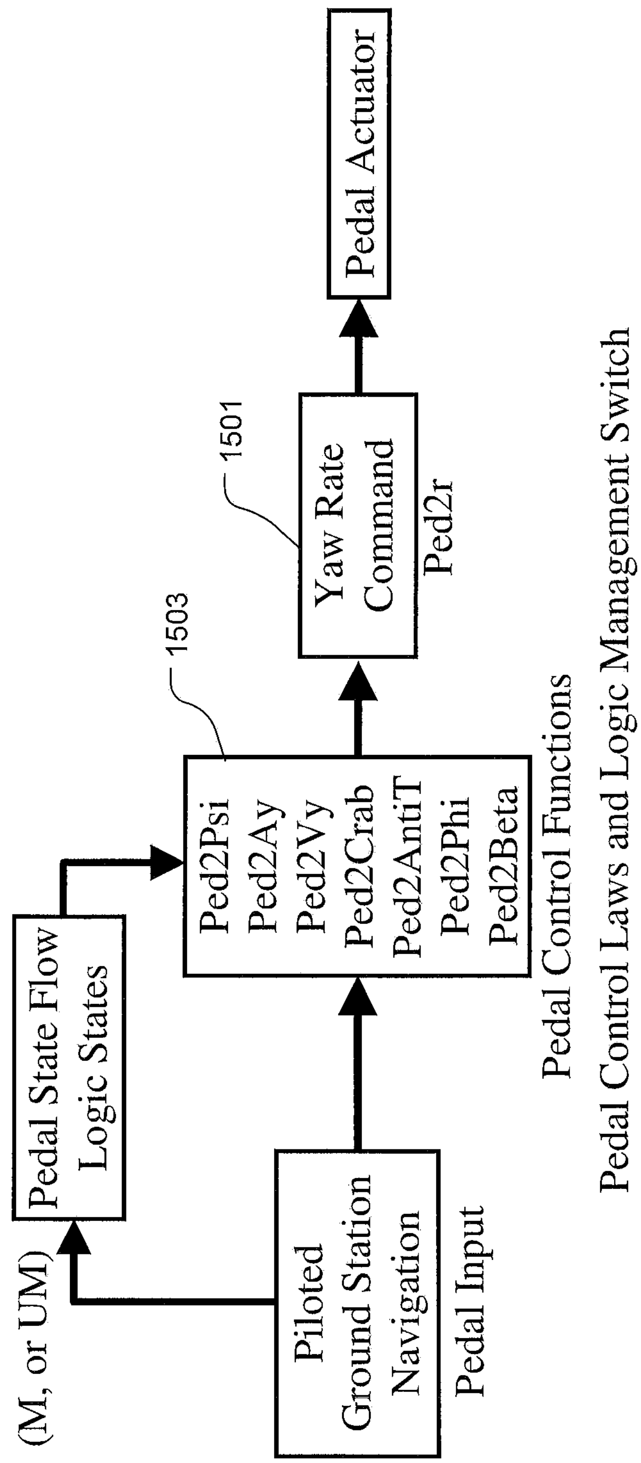
FIG. 15 shows pedal control loop with logic state.

The figure describing the finite state machine approach for the Pedal Module 1401 is shown in FIG. 14. This pedal state machine module in FIG. 14 shows eight states; each of these states has an associated control law loops as shown in FIG. 15. The first state is shown in box 1403 while the remaining states 2-8 are shown in box 1405. It should be noted that all pedal states from VTOL to airplane and then to the pedal structural protection design are all included in this directional control laws design. However, some of these states may not be used for the manned type of flight control, which means it is reserved for the unmanned functions.

The Ped State "1" called Pedal SCAS Mode activates a single feedback loop called the yaw rate command mode. This mode is the main control for the entire directional feedback system. The related control laws loops for pedal state machine are shown in FIG. 15. Ped2r 1501 uses the Ped State "1' logic from Pedal State Machine to enter and exit the control laws. Ped2r loop may contain the pure rate feedback control only for directional controllability and stability in the rate loop design. From FIG. 14, the pedal state machine will generate the Pedal State integrator number from (1, 2, . . . , 8), as shown in box 1503. Each number will have the associated control laws loop to make the entire flight as desired.

In the low speed or hover environment, VTOL aircraft can be designed to be rate command and heading hold. The heading hold function will depend on the pedal in the detent position or not. The automatic heading hold function is controlled by Ped State "2" in Pedal State Machine FIG. 14 also called Ped2Psi in FIG. 15.

When the aircraft is at high speed, the aircraft control laws can be designed to be Ped2Ay (Ped State "3") or Ped2Vy (Ped State "4") depending on sensor availability. Note that these two state machine numbers can also be reserved for the airplane flight.

Similar to the lateral state machine and control laws, the pedal state machine and control laws also contain ped2Crab design, Ped State "5". When entering the Crab mode, Lat2Crab and Ped2Crab will work as a pair. The difference between these two state machines and control laws designs are when the pedal is pressed to control the crab angle during the approach, the pilot can leave the cyclic stick to in-detent position. Dynamic speed holds on the cyclic function (lateral and longitudinal speed hold) will kick on so that the original forward speed can be converted to square root of $(V_x^2+V_y^2)$. At the end, the aircraft will hold the original ground track and velocity. Therefore, the Ped2Crab and Lat2Crab are reserved for mid speed and low speed flight in VTOL mode only.

Ped2AntiT mode in FIG. 15 works as a pair of Ped State "6" in FIG. 14. This mode is reserved for VTOL only such as a helicopter. When the collective level is pulled or pushed, the changes of the main-rotor torque will affect the tail rotor directional control. To automatically take care of this effect, the ped2AntiT is designed. In the past, ped2AntiT control loop is designed with a constant value based on the small collective level travel. When large collective travel is applied such as autorotation entrance, the way to maintain the directional loop under control will also depend on the control arrangement. Ped2AntiT is designed not only for small collective maneuver, but also for the large collective travel.

In the high speed autorotation entrance, if the directional pedal is running out of travel either on the stick or on the actuators, the Ped2Phi will automatically kick on to protect the directional feedback loop and also release the pedal travel. The pedal to phi loop in FIG. 15 contains and inter-axial control to lateral maneuver. Its associated state machine is Ped State "7". This protection loop can also be applied to helicopter high speed flight and airplane flight. In helicopter high speed flight, when a large pedal travel from Ped2Ay command is suddenly applied, the possibility of hitting the tail boom structural limit is very high. To protect this occurrence, Ped2Phi loop and its associated state machine play an important role. This function is reserved in this VMS FCC architecture.

In the airplane flight, the pedal can be used to control the sideslip angle (Ped2Beta, Ped State "8") in the normal flight. When a single engine fail occurs and Ped2Phi can automatically kick in to allow the pilot to tune the pedal setting to the stable neutral position. This function will buy out more time for the pilot to react.

Collective State Machine

The collective FBW system is the most difficult axis to design for bi-fly aircraft. In classic control laws design, usually collective control is of the direct link with back-driven actuator function for the trim control. For the FBW collective control, this rule does not hold any more. The extra collective functions must be considered and reserved first. Therefore, the invented FBW collective control state machine contains more than 15 states as shown in FIG. 16. On the left side of the collective state machine diagram 1601 in FIG. 16, this diagram is equivalent to the Lon2q or Lat2p or ped2r loops. The variables in this diagram are the main collective control states for the collective control. The right diagram 1603 on the collective state machine in FIG. 16 is the sub-function of the main collective variables on the left hand side. Usually, Col State numbers of the right hand side diagram on FIG. 16 are for the trim functions, or small adjustment after one of the main collective variables on the left hand side stick is set to the desired maneuvers. Note that Col State (0, 3, 4) on the left hand side are designed for the airplane mode functions. The Col State (0, 1, 2) on the left hand side are reserved for VTOL functions. Both helicopter and airplane functions are reserved in this collective state machine design. Therefore, functionalities of the tilt-rotor, or tail-sitter, tilt-wing, X2 and X3 aircraft transitioning from helicopter to airplane or airplane to helicopter are all reserved in this collective finite state machine design.

Col State 0 is the manual collective function without any feedback. This loop is reserved for the all sensor failure or the auto-rotation requirement or partial authority control laws design. In this state flow number, the aircraft on the collective axis will fly just like the traditional direct-input collective function. This loop is also one of the best loops for autorotation entry. During autorotation entrance, the collective can be immediately dropped to near minimum position so that the rotor RPM will be maintained approximately 100%. Depending on airspeed and altitude, the manual collective control with the longitudinal F/A stick can be used to adjust the combination of percentage of RPM, the forward airspeed and the altitude descent rate. This is how the pilot accomplishes the autorotation maneuver. The related collective control laws for this loop are shown in FIG. 17 called Col2Direct, as shown in box 1701.

The Col State "1" is the standard application for FBW collective control laws. This Col State number is to control the collective with respect to altitude rate, which is called either H_dot or vertical velocity. The associated control laws diagram shown in FIG. 17 is called Col2Vz. Collective control input can command steady state descent rate or steady state climb rate.

The Col State "2" is of a special function, which will improve the collective quickness. Usually, the collective maneuver from the collective controller is with several milliseconds time delay, because of weight, engine power, torque and inertia limits of VTOL design. To accelerate the collective controller, the Col2Az design can be used. However, this Col2Az loop is preferred to be used in the descending mode instead of climbing. Col2Az in the climbing mode may cause the aircraft to be over-torqued instantly. However, for the collective control to be descending quicker than that of manual collective control, one can set the descending accelerating rate is higher than the earth gravity (32.2 ft/sec$^2$ or 9.81 m/sec$^2$). Therefore, this loop is a specific design to assist the VTOL autorotation entry if the dual engine failure initial entrance time detection is a little too long. The associated control laws diagram shown in FIG. 17 is called Col2Az or Col2Nz.

The Col States "3" and "4" are reserved for the (fixed-wing) airplane mode. In airplane mode such as tilt-rotor or tilt-wing, the rotor or nacelle is parallel to the earth ground or close to parallel to the earth ground. In this condition, the collective control is to generate the forward thrust to make the aircraft flying forward fast or slow down. In this mode, the collective controller can make the aircraft move faster or slow down by controlling collective blade pitching angle or RPM. Therefore, the associated control laws loops in FIG. 17 for airplane flight are Col2Ax or Col2RPM in Col Inner Loop. Note that the Col Control Functions Loop in FIG. 17 also contains a Col2RPM design. However, this loop is reserved to RPM noise management design for friendly community FAA requirement.

Col State numbers ("6", "7", "8", "9", "10", "11", "12", "13", "14" and "15") are the collective control for the collective trim functions or close to trim functions. For example, Col FADEC mode, as depicted in box 1703, in Col State "6" is to assume that FBW control laws in collective are designed with engine FADEC control. If this is the case, Col2FADEC inner loop will be either Col2Direct or Col2RPM. Once RPM and FADEC are set to hold 100% RPM, the collective controller can be used for vertical velocity control or direct collective input similarly to the classic collective design.

Col State numbers of "7" and "8" are used to hold the steady state vertical velocity or climb angle. The possibility of triggering these hold modes are: 1. During approach mode (the pilot sets this mode on); 2. The ground altitude and baro altitude sensors are not reliable (fault and/or failed); and 3. Low speed, low altitude, off shore oil-deck (on/off) approach: During this maneuver, the ground altitude will be suddenly increased approximately to 200 feet when the aircraft is off the deck. The altitude hold function will be jumping. Note that these two state numbers are also good for the collective beep functions for a small altitude adjustment.

Col State numbers ("9", "10" and "11") are the function for collective altitude hold. Although GPS altitude may not be satisfied as a hold-mode in the current FAA certification rule, Col2GPS_z is reserved for future usage. Collective control laws in logic and loops should be designed with respect to the pitot/statics plate availability and validity from the pitot tube and statics plate manufacturers. For example, when airspeed is too low and altitude is close to the ground, the signals from healthy pitot tubes and statics plates should be by-passed. Therefore, the signals of the ground velocity and radar altitude shall be picked in this condition.

Col State numbers ("12", "13" and "14") are reserved for the airplane mode worked as pairs of COL2Ax, COL2RPM and COL2Direct inner loops.

The above collective finite state machine will reserve the following designs for FBW collective control: FBW Collective Envelope Protection System; Vortex ring protection; FBW Collective Over-torque Protection System—this is also called collective limit cueing; FBW Collective Automatic Auto-rotation Assistant System; Collective dual engine failure RPM-stall protection; FBW Single Engine Failure automatic Recovery system; Collective CAT A design; FBW Collective Auto-Land/Auto-Takeoff Control System; FBW Collective Touch Down Protection System; FBW Collective Shipboard Operation Protection System; FBW Collective Ground Operation Protection System; Collective RPM Noise Reduction System; Friendly community VTOL design using RPM noise level management design; FBW Collective Requirement for Unique Trim versus Trim Back-Driven Design; Collective unique trim can be designed for manned and unmanned design to avoid back-driven motor design—save the equipment and increase collective bandwidth during the hold mold; FBW Collective Requirement for Individual-Blade-Control System; Reserve the collective function for individual blade control rotor system; FBW Collective Requirements for Bi-flying (Tilt-rotor) Aircraft; Auto converting for bi-flying aircraft such tilt-rotor, tilt-wing, tail-sitter, X2 and X3 type of hybrid VTOL; and FBW Collective Requirements for VTOL Flying Car.

Navigation Finite State Machine

Navigation finite state machine contains the standard navigation flight functions, which include: Auto take-off; Multiple waypoint flight; Final Approach; Auto land; Ground operation; Shipboard operation flight; and, so forth.

Some of the above are typical autopilot functions. The rest of navigation state machine are to enhance the navigation functions for other operations such as ground and shipboard operations.

Others Reserved Finite State Machines

All above state machine designs are preferably module-based, which means they can exist individually. Therefore, any other new module state finite machines can be added on, based on the individual function requirements. These reserved flights can be based on any device failures and protections. They can also be based on flight envelopment protection to advise the pilot the limits of individual axis or to protect unmanned flight regime within flight envelope. Therefore, these functions can be: Limit cueing (all four axes, Lon, Lat, Ped and Col); Maximum airspeed protection; Maximum altitude protection; RPM noise flight envelope management requirements; Others (like emergency mode).

Any of the above flight protections can be used by a simple individual finite state machine. This state machine can then be added on the architecture of the current M/OM/UM VMS so that the entire system can be integrated into the future aircraft central-management integration format. Automatic mode selection state machine will be discussed later to address how it is integrated.

There are several advanced functions contemplated in the present application. For example, for auto-rotation maneuver during engine failure mode, the collective must place to the full down position immediately to maintain RPM close to the range between 90 and 100% area and then fine adjust helicopter RPM using the collective stick. Usually, the collective manual stick function is used to achieve this mode. The traditional vertical maneuver mode may make several mini-second delays, which will generate the risk of RPM stall. However, the Col2Az or Col2Nz state machine and associated control laws loop is reserved in the present application, because the Col2Az loop with forward lead gain design can achieve the autorotation entry much faster than that of direct manual mode. This means that the reserved loop will buy several mini-seconds ahead of the pure manual mode for auto-rotation maneuver. Therefore the possibility of RPM stall will be low during autorotation entrance.

Entire VMS architecture is also considered to be ready for airplane and helicopter bi-flight mode, since collective loop can be transferred to the thrust functions such as Coll2Ax loop and state flow design. These collective designs can be coupled with Ion2Alt and Lon2Nz or Lon2Az loops such that the collective and longitudinal control pair can be used for the pure airplane mode.

Collective to RPM loop is reserved for helicopter noise management system. Per the new federal regulations, on the certain ground altitude and airspeed, the noise of helicopter need to drop to certain level. The RPM noise management method can be implemented through Col2RPM with Col2FADEC control loop design to make the entire function automatically. Once RPM had been dropped to required value, the standard altitude hold or vertical speed climbing/descending mode can be performed normally.

For the tilt-rotor type of aircraft such as V-22 or 609, one can design a nacelle tilt finite state machine with speed corridor region with the current modular architecture design. The innovated state flow architecture can be immediately implemented to achieve tilt-rotor control laws design very quickly. Similarly, if the tiltrotor balde can be folded, a state flow machine can be implemented to make rotor stop/fold and extend/rotate functions so that the entire control and management system will not need to be re-designed. The individual balde control aircraft can be implemented by the standard longitudinal, lateral, pedal and collective state machine by using mixing matrix design for actuators.

Manned, Optional Manned and Unmanned State Machine

Figure 18:
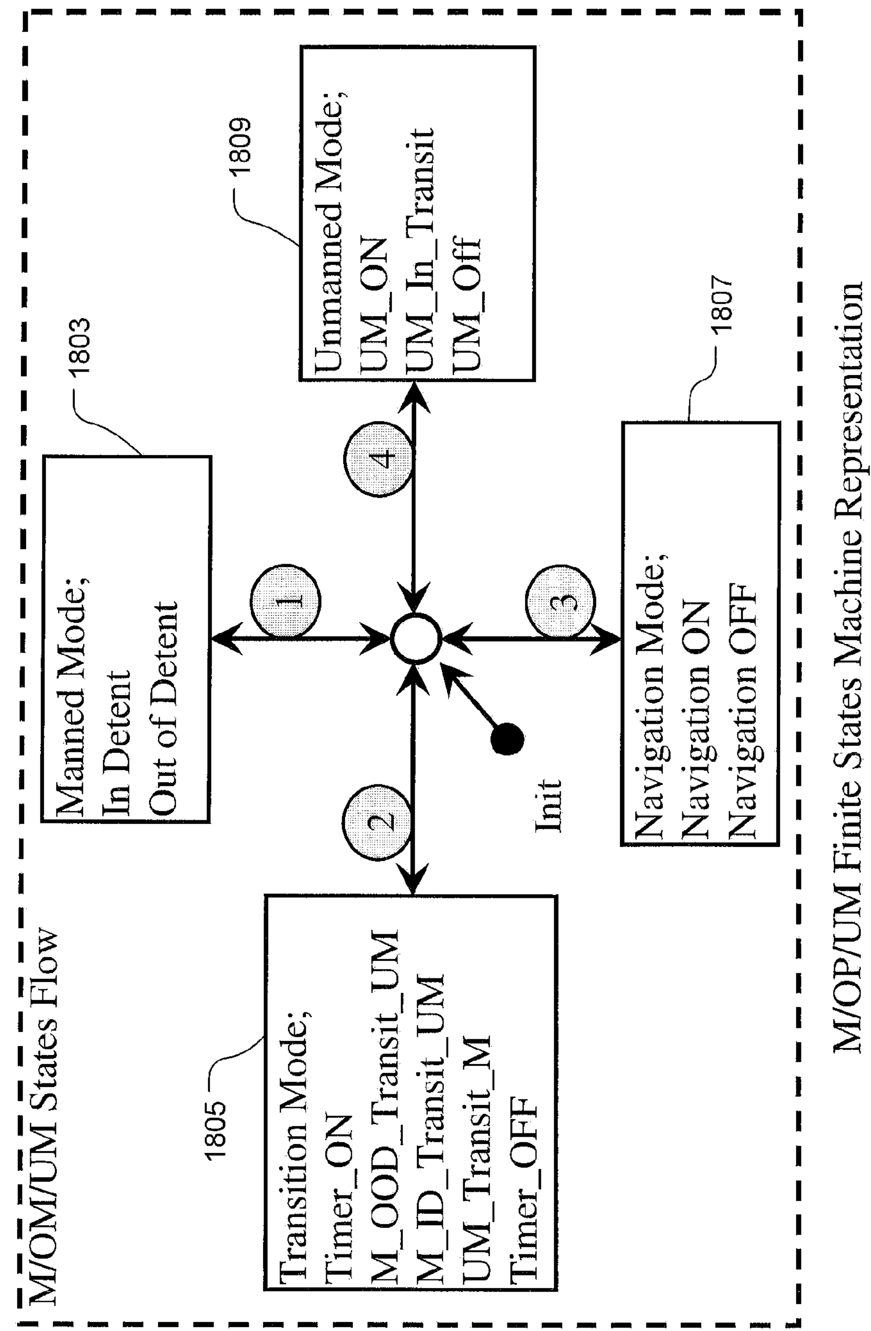
FIG. 18 shows M/OM/UM state flow design.

The M/OM/UM finite state machine, as depicted in box 1801 of FIG. 18, contains four portions, which are Manned Mode 1803, Transition Mode 1805, Navigation Mode 1807 and Unmanned Mode 1809.

The first portion of the M/OM/UM finite state machine is the Manned Mode 1803, which the pilot manually controls the aircraft. In this manned command, the pilot can make the aircraft controllers either in detent (ID) position or out of detent (OOD) position. The individual state flow from four control axes will automatically and seamlessly trigger the associated control loops so that the manual flight can be accomplished following the standard manual flight. When the pilot places the sticks back to the in-detent position, the individual hold mode will be automatically and seamlessly engaged such that the aircraft will maintain its current heading and/or attitude and/or airspeed, and altitude or vertical velocity. When the pilot presses the autopilot mode for navigation or waypoint flights, the M/OM/UM state flow will automatically switch to Navigation Mode as shown in FIG. 18.

The second state in M/OM/UM finite state machine is the Transition Mode 1805. Four aspects in the Transition Mode of M/OM/UM finite state machine have been considered for transient on/off Manned Mode for the OOD condition. In OOD condition, transition from manned mode to unmanned mode can depend on the following conditions: a. Transit because the pilot intends to do so (the pilot presses the unmanned button in the cockpit); b. Transit because the ground pilot command takes control (the unmanned ground station takes control after communicating with the pilot); c. Transit because the pilot loses conscious-nous (the sensor command installed in the pilots takes the control); and d. Transit because the aircraft is hijacked (a special function invented in this state flow machine).

During the condition (a, b, and c) transitions, there is a timer design which will allow the aircraft to be brought back to a safe transition condition first so that the unmanned mode will take controls. Depending on the conditions and maneuvers when the controllers are OOD, logic design of this timer can be within two to five seconds with combination of the flight mechanics state variables. For the condition (d) transition, commands of the aircraft controllers for all axes must be immediately removed regardless of the controllers OOD or ID position. The aircraft will immediately switch to the ground control condition commands. However, if the all or most controllers are with the in-detent position or within the tolerance from all flight mechanics state variables, the timer deign will not be triggered. This means the aircraft can be immediately converted to the unmanned mode.

The third mode is the Navigation Mode 1807. This mode is referred to as the autopilot mode of the flight management system. In this mode, the aircraft is controlled by the four axial hold conditions. Therefore, this mode is the safest way to switch (from manned to unmanned mode) or (from unmanned to manned mode). Note that navigation flight can be turned on for both manned and unmanned flights. However, during the both navigation flights, switching from manned to unmanned or from unmanned to manned should be immediately implemented.

The last one is the unmanned mode 1809. During the unmanned mode flight, the command of the aircraft is managed through the ground control station wireless signal. This signal set can be waypoint flight, straight level flight or any combination of (heading angle, airspeed, altitude). The unmanned mode can also take the ground control stick signals for other safe maneuvers. On the ground stick control maneuver, the aircraft will be operated similar to the manual manned type of flight. However, for the unmanned flight, the command can be any combination of modes in control laws design on the following: Long State Number (1, 2, 3, 4, 5, 6 . . . ); Lateral State Number (1, 2, 3, . . . ); Pedal State Number (1, 2, 3, . . . ); and, Collective State Number (1, 2, 3, . . . ).

For example, during the high airspeed and high wind condition, the manned aircraft flies with side-slip angle while holding aircraft almost level. For the same condition, the unmanned aircraft can hold the steady state heading with wing not level to cancel out the wind effect.

Automatic Mode Selection State Machine

Figure 19:
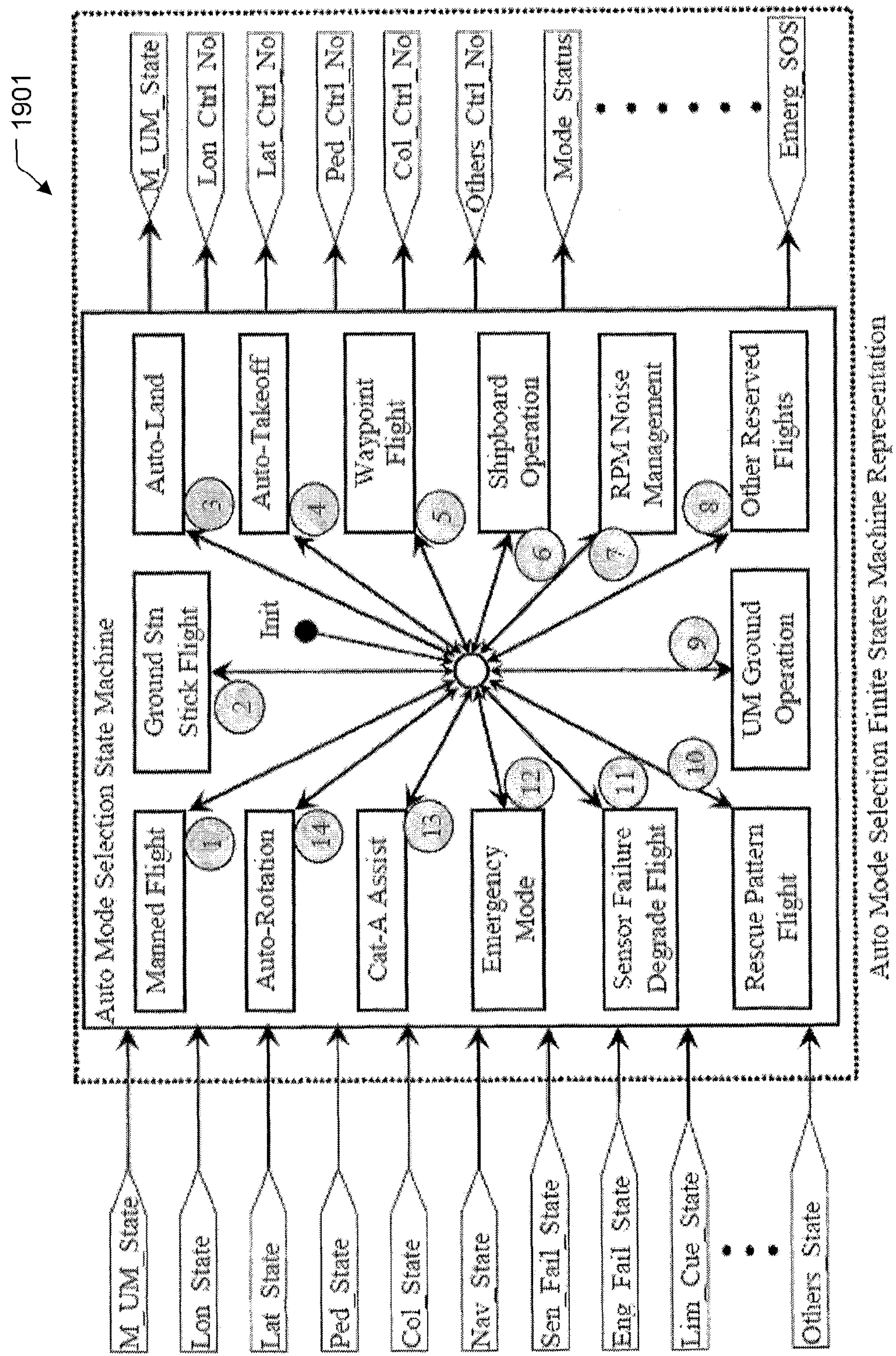
FIG. 19 shows automatic mode selection state flow design.

Automatic Mode Selection state machine 1901 is shown in FIG. 19. All reserved flight maneuvers from manned and unmanned with sensor failure or emergency conditions are all reserved in this M/OM/UM VMS architecture design. The inputs of this state machine are all the outputs from the previous discussions such as Lon State Machine, Lat State Machine, Pedal State Machine, Collective State Machine, and Navigation State Machine, and so on. The outputs of the state machine are to control the aircraft with individual axial flight numbers such as Lon_Stae_No, Lat_State_No. Ped_State_No, Col_State_No and so on. For the manned type flight, the aircraft will be set based on the Auto_Model_Sel_State "1". Therefore, the entire flight will be based on the manned-type flight. Similar, all other flight are listed as: Manned flight "1"; Ground station stick command flight "2"; Auto land "3"; Auto take-off "4"; Waypoint flight "5"; Shipboard operation "6"; RPM noise management "7"; Other reserved flights "8"; Ground operation "9"; Search and rescue pattern flight "10"; Sensor failure degrade mode flight "11"; Emergency mode "12"; CAT-A assistance flight "13"; and, Auto-rotation entry assistance "14".

The emergency mode flight 12 discussed above is referred as the hijack mode or the pilot lost conscious-nous mode. All these functions are finally integrated into this auto mode selection state machine. Note that this machine will also output the mode status to the FCC to inform the pilot or the ground pilot with all state numbers and mode selection. With this state machine, all M/OM/UM flights with envelope protection, sensor failure protection, equipment failure and community friendly flight are fully integrated. This machine can also be considered to work as a central management unit to control combination of individual state machines so that the control loops from each axis can be correct turn on or off. For example, if the sensor failure is detected in airspeed, depending on the design, the attitude hold mode may still be used with gain scheduling method dropped to the main set. In this way, the pure rate command mode can be avoided. Similarly, on the sensor failure logic design, if all GPS are failed or the GPS signals get blocked, the aircraft can still be designed to the default mode as the speed hold, altitude hold and heading hold until the next command is received.

Fly-by-Wire Versus Partial Authority FCC

Figure 20:
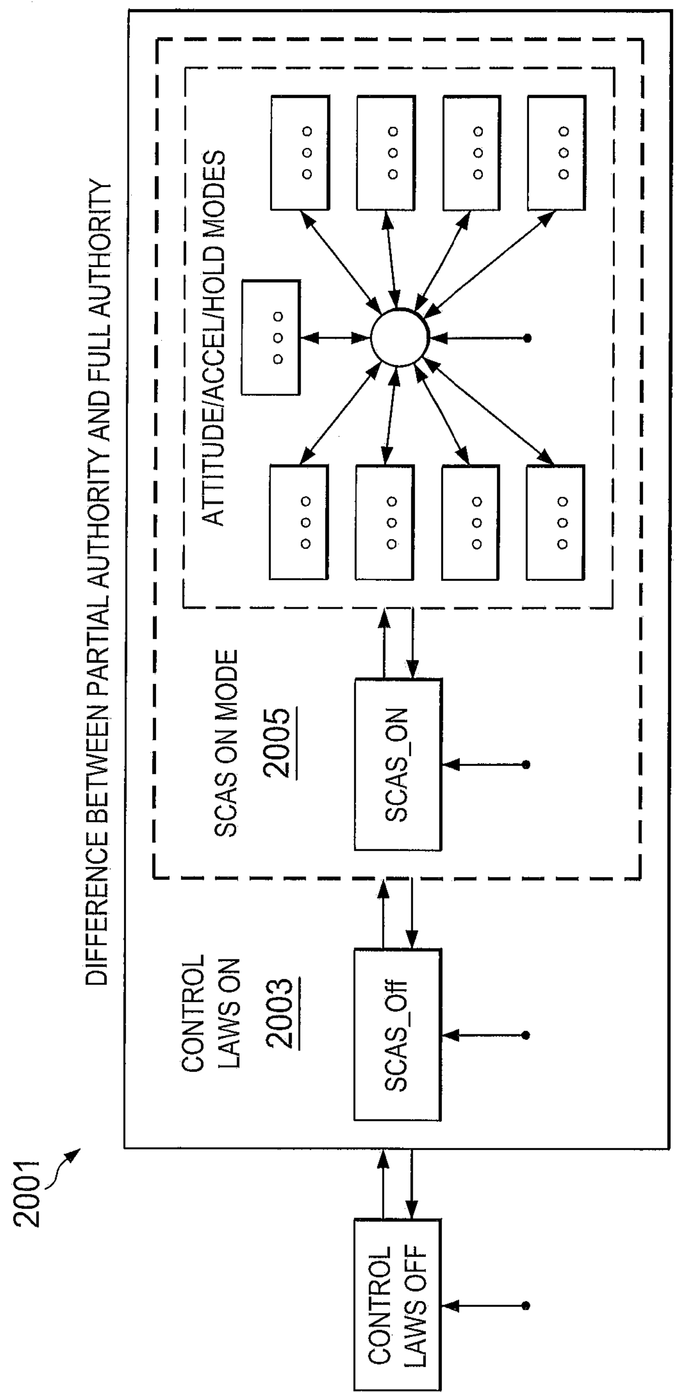
FIG. 20 shows partial authority CLAWS with control laws off and control laws on finite state machine.

FIG. 20 shows a diagram 2001 that illustrates the differences between integration of partial authority and full authority FCC on finite state machine implementation. Note that FBW FCC designed can be implemented either SCAS_ON Mode, as depicted in box 2003 or SCAS_Off Mode, as depicted in box 2005. When implementing (SCAS_ON and above) for full authority FBW system, the aircraft on the ground mode is with SCAS_ON. The feedback gain set for ground mode will be different with in-flight mode. When implement (SCAS_OFF and above) for the FBW flight control system, the aircraft on the ground is automatically shut-off. The aircraft ground logic will include weight-on-wheel signal and ground speed or wheel speed information. For the partial authority flight control system, the control laws must be shut-off, because of safety issue from FCC failure rate and partial authority actuator failure rate.

Because of the above nature in the control laws design requirement by FAA, the desired state machine for partial authority FCC is shown in FIG. 20. It is shown that the state flow number of 0 is reserved for the control laws off mode. Both partial authority and full authority can have State__0 mode in the current four state machine designs. When State 0 is active, control laws are off and pilot is flying in manual mode. The control laws in State__0 will link to a direct input line inside of the control and by-pass all feedback to avoid ground resonance. For the partial authority system, one can also design State__1 mode with ground altitude to slowly degrade to the ground mode. For example, FAA requires that when ground altitude is lower than 50 feet, the collective partial authority system cannot have altitude hold mode. This means that some or most of the hold conditions can be designed to be disengaged so that FAA regulation will be automatically granted. However, for the FBW system, since individual system failure rate is lower than that of $10^{-9}$, auto land and auto take-off can be designed. The ground mode can be implemented two ways. All these functions have been considered and reserved in this architecture of M/OM/UM VMS.

Other State Flow to Assist Flight Performance

Figure 21:
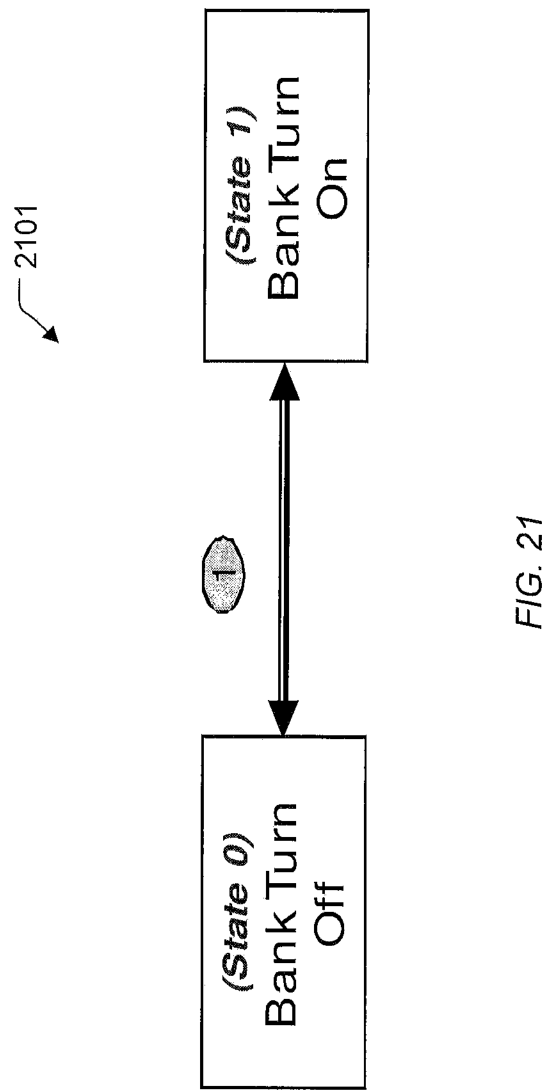
FIG. 21 shows bank turn mode selection finite state machine.

There are two other state machines which will help flight qualities. Note that these state flow numbers will be automatically engaged when the flight conditions are matched with logic design. The first one as shown in diagram 2101 as depicted in FIG. 21, which shows the control turn coordination function. This bank turn mode selection state machine will work with the airspeed/ground speed assistant state machine shown in diagram 2201 of FIG. 22 to help manned and unmanned flights to determine when the turn coordination will be turned on or off. The transitions between each speed zone are within 5 to 10 knots latch design such that the aircraft will not be going to the intermediate on/off situation. The logic of rising-edge and falling-edge with various bank angles depending on flight envelop are all included in this state machine. With these two state flow designs, the aircraft can be easily controlled for the following maneuvers: Low (Ground) Speed turn coordination flight; Mid-speed turn coordination flight; High Speed turn coordination; and, Smooth transitions between each speed with and without turn coordination functions.

Figure 22:
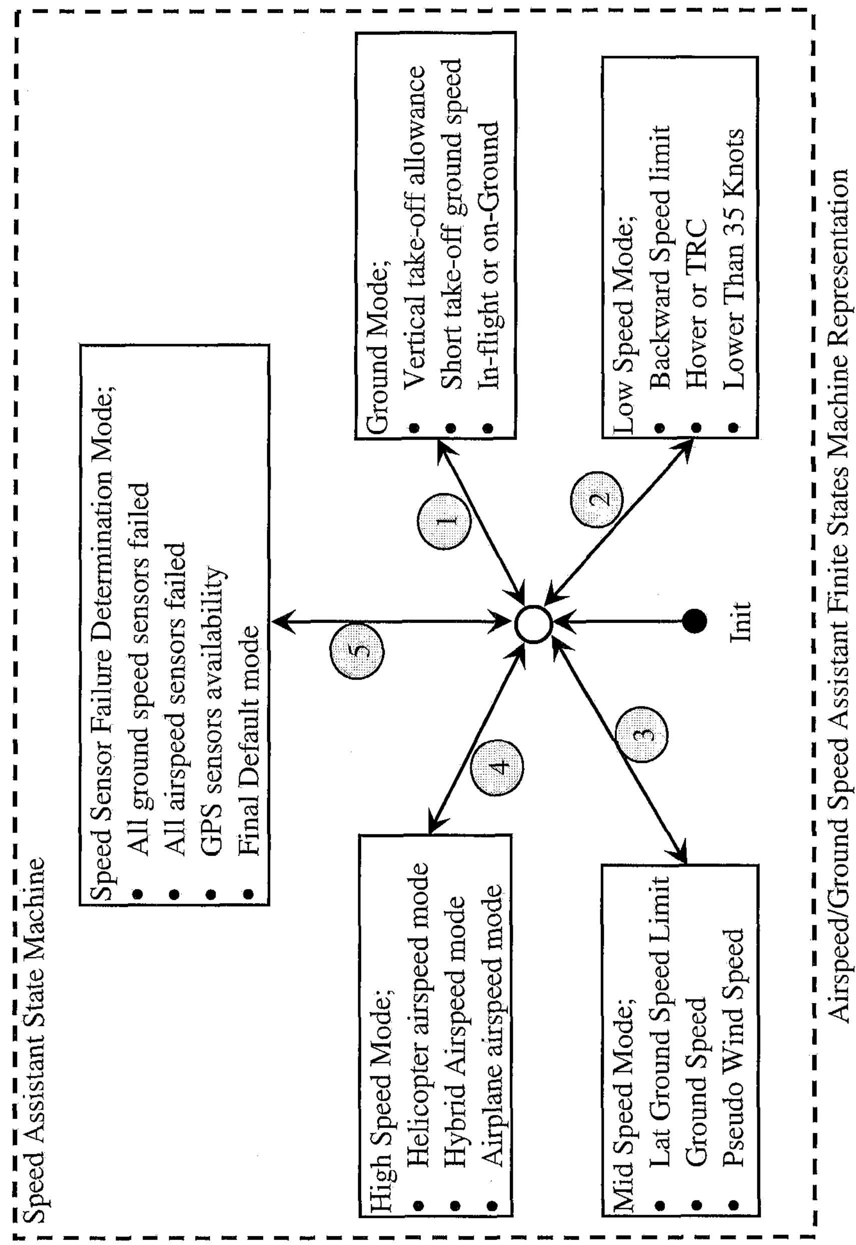
FIG. 22 shows airspeed/ground speed assistant finite state machine.

Airspeed/ground speed assistant finite state machine as shown in FIG. 22 is not only designed to help the turn coordination functions shown in FIG. 21. Airspeed/ground speed assistant finite state machine also reserves the logics of determining the aircraft in-flight or on-ground for ground operation such that the aircraft can take off as an airplane or SVTOL.

Airspeed/ground speed assistant finite machine contains five numbers. The first number is for the ground mode, which is integrated with the weight-on-wheel (WOW) switch. The logic of ground speed with WOW sensors are integrated together to determine the ground mode. When the ground speed is higher than a certain value, the aircraft can be determined to be in-flight mode so that the control laws will be properly turned on. Speed_State__2 is for the low speed function. Usually, this number is for the ground speed operation. Speed_State__3 is for the mid speed operation. This mode is set to integrate the ground speed and airspeed together. This mode is also integrated with manned type turn coordination performance for VTOL aircraft. For the fixed-wing, the aircraft will have either Speed_State__4 or Speed_State__5. Note that the Speed_State__4 is used for the high speed turn coordination function. The Speed_State__5 is reserved for speed sensor functions. When all speed related sensors failed, this mode will be turned on. Depending on the sensor failure mode design, the strategy of the flight control laws can be implemented based on manned or unmanned. This topic will be discussed in a separate patent application.

Flight Simulation and Discussion

The above described VMS FCC System was implemented in Matlab-Simulink s-function for a Bell Model 412 aircraft. The system was tested extensively in batch as well as pilot-in-the-loop simulations for each state and each transition. This section discusses some of the examples from these tests.

Figure 23:
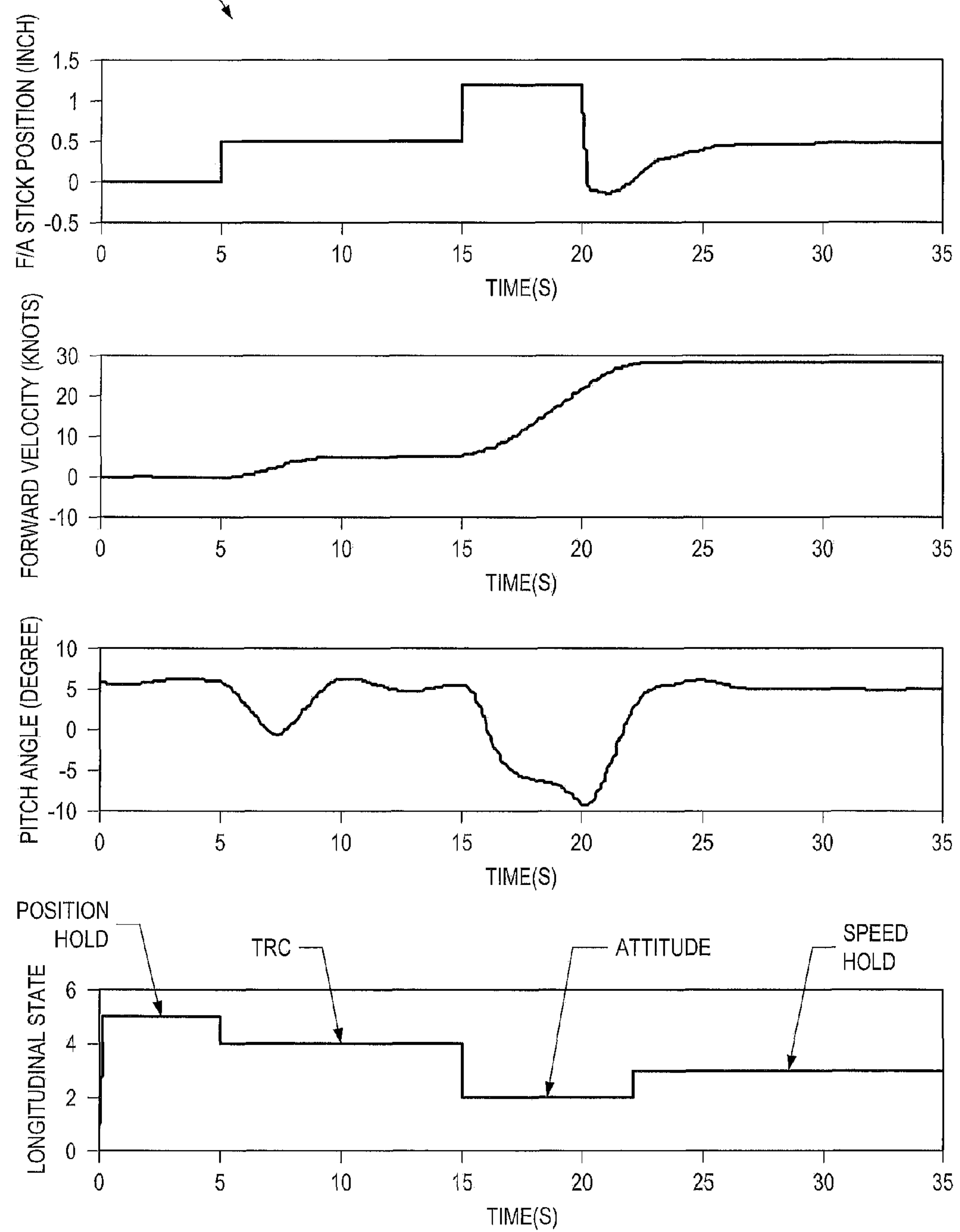
FIG. 23 shows the simulation results for longitudinal state change.
Figure 24:
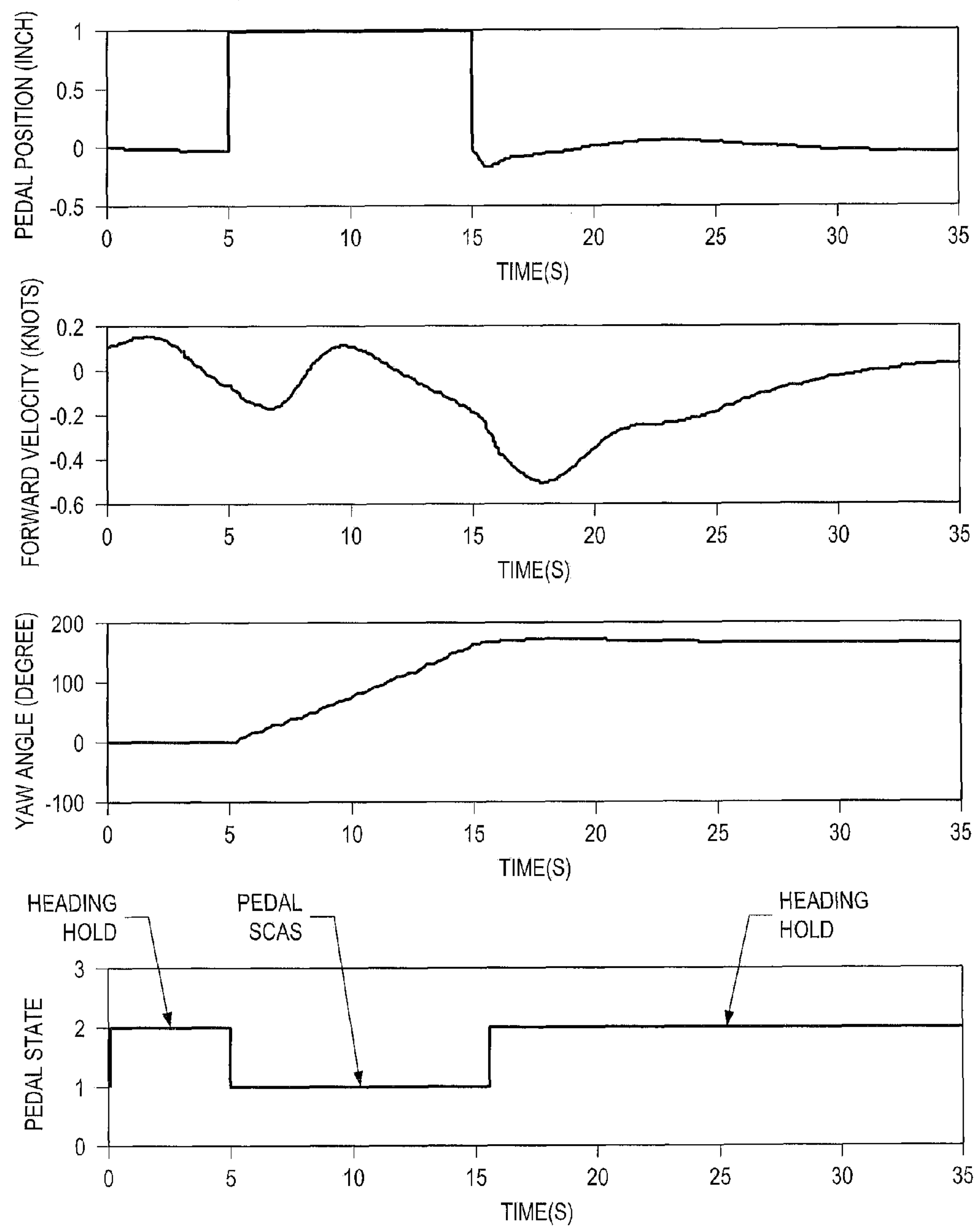
FIG. 24 shows the simulation results for pedal axis state change.
Figure 25:
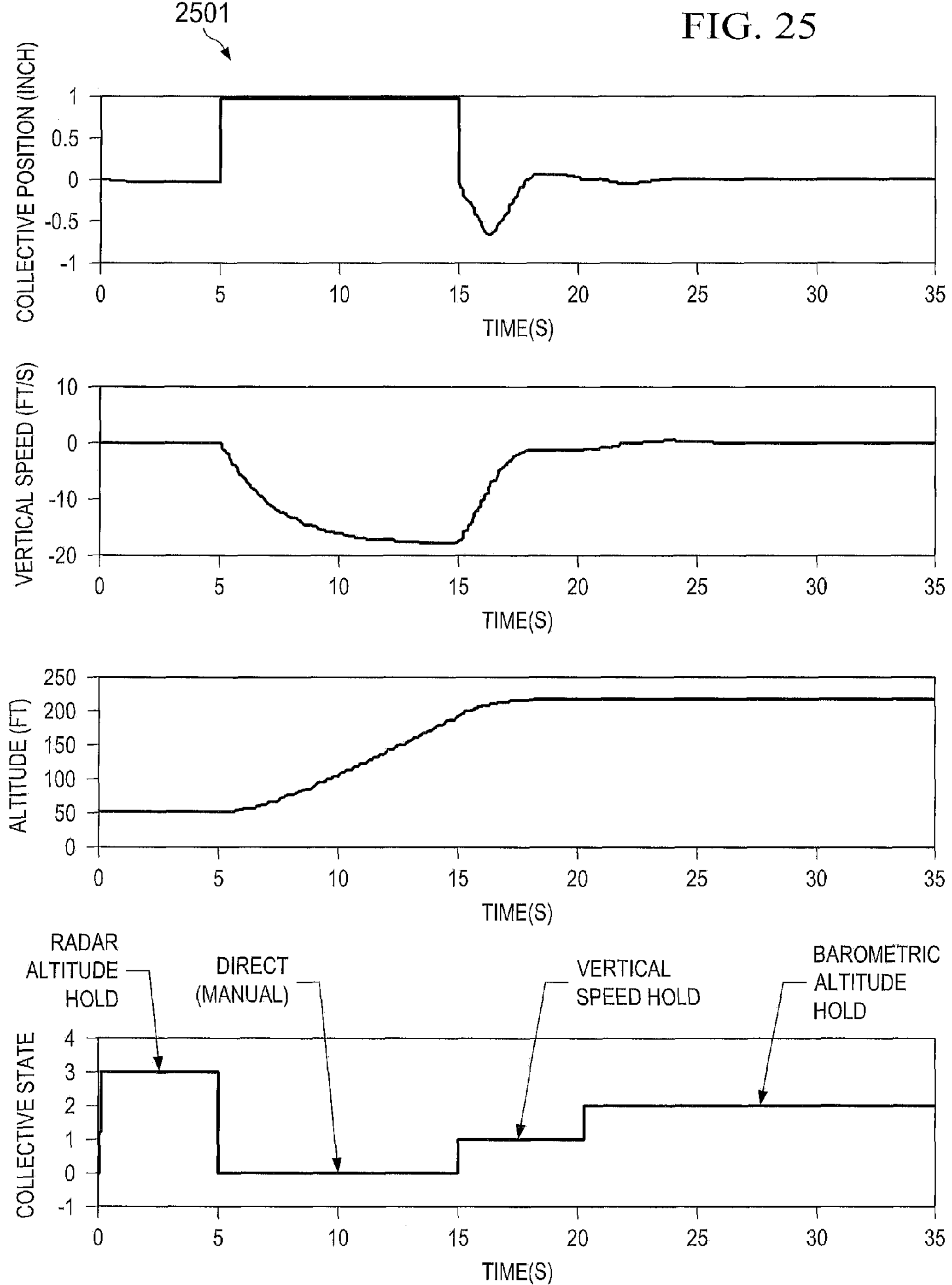
FIG. 25 shows the simulation results for the collective axis mode selection.

A manned type of flight simulation shown in FIGS. 23 to 25 is used to illustrate the entire integration. Note that the individual stick command input is shown in the top subplot of the individual figure. All four axial controls are shown in the simulation demonstration. Each figure also shows the transitions for changing from one state to another. The transition 1 implements the engagement and disengagement logic for turning control laws on and off. Since partial authority control system is also mentioned in the present application; therefore, the direction mode (Col_State__0) on the collective axis is illustrated in this simulation and discussion session.

It should be noted that this and other transitions described here may implement different engagement and disengagement logics. When the engagement logic criterion for the transition 1 is true, the finite state machine activates either States 1, 2 or 3 depending on the other transition criteria. When the disengagement logic criterion for the transition 1 is true, it overrides other criteria that are lower in hierarchy and activates the State 0. The lower hierarchy criteria for this transition 1 are all the criteria that fall under the group 'Control Law On'. Similar to the transition 1, the transition 2 sets the engagement and disengagement logic for turning SCAS mode on or off. The lower hierarchy criteria for this transition are all the criteria under the group 'SCAS on'. The transition 3 engages or disengages the attitude mode.

FIG. 23 depicts plot 2301 that shows the simulation results for longitudinal state change. As a development standard, the State 0 was assigned to manual direct mode where the pilot is in control and the control laws do not generate any actuator commands for that axis. FIG. 23 contains four subplots, which from the top to the bottom are the pilot longitudinal control input command, forward velocity of the aircraft, the pitch angle and the longitudinal state selected by the control law. The simulation starts with the aircraft in the position hold mode which corresponds to the Longitudinal State 5, when unmanned mode is disengaged. At 5 seconds in the simulation, pilot commands a 0.5 inch control input. The longitudinal mode selection logic switches to the TRC mode (State 4). The control law holds a steady 5 knots of airspeed. At 15 seconds into in the simulation, the pilot commands 1.2 inches of control stick. The longitudinal state selection switches to Attitude Mode (State 2) to provide the required agility. At 20 seconds into the simulation, the pilot moves the longitudinal stick back to detent. The longitudinal mode selection logic holds the attitude mode until aircraft reaches a steady velocity and then engages the Speed Hold Mode (State 3). All these state transitions are done automatically by analyzing the control input and sensor data. The pilot does not need to press any switches to engage these modes. The switches are only provided as an override. The lateral state change is similar to the longitudinal axis and hence it is not included in this section.

FIG. 24 depicts a plot 2401 that shows the simulation results for pedal axis state change. FIG. 24 contains four subplots, which from the top to the bottom are the pilot pedal control input command, forward velocity, heading of the aircraft and the pedal state selected by the control law. In this simulation, aircraft starts in a Heading Hold Mode (State 2). The pilot commands 1 inch of pedal input between 5 to 15 seconds. The pedal state changed to the Pedal SCAS (State 1) mode to achieve this heading change. After the pedal returns to detent and the yaw rate reduces below threshold, the system engages the Heading Hold Mode (State 2) again to capture the new heading.

FIG. 25 depicts a plot 2501 that shows the simulation results for the collective axis mode selection. FIG. 25 contains four subplots, which from the top to the bottom are the pilot collective control input command, vertical velocity, altitude of the aircraft and the collective state selected by the control law. This simulation starts with aircraft in position hold mode at 50 knots. Due to proximity to ground, the Radar Altitude Hold (State 3) mode is engaged first. Pilot commands 1 inch of collective stick between 5 to 15 seconds. Since the simulation was performed for partial authority system with no SCAS actuator on the collective axis, the collective mode selection logic engages the Direct/Manual Mode (State 0) in which the pilot has all the control. Once the pilot moves the collective stick in detent at 15 seconds, the state selection logic engages the Vertical Speed Mode (State 1) to reduce the vertical velocity. Once the vertical velocity is below threshold, the logic engages the Altitude Hold mode. Since the new altitude is above the radar altitude threshold, the logic engages the Barometric Altitude Hold Mode (State 2).

In summary, the manned Vehicle Management System performs well in selecting the appropriate state of operation for the given flight condition. The transition between the states was smooth. The entire simulation was switchless and seamless. The design and integration of the Vehicle Flight Management system using finite state machines performed well under various conditions.

Although particular step sequences are shown, described, and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle, comprising:

a plurality of actuators; and a management system, having:

an interface configured to provide a parameter; and a computer operably associated with the interface, the computer having:

a control architecture configured to analyze the parameter, the control architecture having:

a plurality of finite state machines; and a plurality of control laws operably associated with one or more actuators;

wherein the computer is configured to selectively match the parameter to a finite state machine in the plurality of finite state machines;

wherein the finite state machine is operably associate with a control law in the plurality of control laws; and wherein the control law is configured to provide command to one or more actuators of the plurality of actuators.

2. The vehicle of claim 1, the plurality of finite state machines comprising:

an automatic mode selection state machine configured to override control of the vehicle during normal operation situations.

3. The vehicle of claim 2, wherein the automatic mode selection state machine is configured to generate a central management concept machine for auto-reconfiguration.

4. The vehicle of claim 2, wherein the automatic mode selection state machine is configured to implement manual, semi-autonomous and fully autonomous operation of the vehicle.

5. The vehicle of claim 3, wherein the aircraft is an unmanned aircraft.

6. The vehicle of claim 1, the plurality of finite state machines comprising:

an automatic mode selection state machine configured to override control of the vehicle during emergency situations.

7. The vehicle of claim 6, wherein the automatic mode selection state machine is configured to override control during a hijacking situation and/or during an operator unconsciousness situation.

8. The vehicle of claim 6, wherein the automatic mode selection state machine is configured to override control of the vehicle during sensor failure situations.

9. The vehicle of claim 3, wherein the management system is configured switch between a partial authority condition and a full authority condition based upon selective flight performances.

10. The vehicle of claim 3, wherein the finite state machine is a control turn coordination state machine configured to turn on and off to assist the aircraft in bank turn control.

11. The vehicle of claim 10, wherein the control turn coordination is operably associated with an airspeed/ground speed assistant state machine;

wherein the airspeed/ground speed assistant state machine assists manned and unmanned aircraft to determine when a turn coordination will be turned on or off.

12. An aircraft, comprising:

an interface;

a plurality of actuators; and a flight control computer operably associated with the interface and the actuator, the flight control computer having:

a state flow logic architecture having a plurality of finite state machines; and a plurality of control laws, each control law being operably associated with one or more finite state machines;

wherein each control law is operably associated with one or more actuators;

wherein the interface is configured to provide input to the flight control computer, which in turn selects the finite state machine for controlling the actuator via one or more control laws.

13. The aircraft of claim 12, wherein the flight control computer is configured to decouple the control law in individual control law flight components.

14. The aircraft of claim 13, wherein the flight computer is configured to compute each control law flight components with a Riccati equation.

15. The aircraft of claim 14, wherein the flight control computer is configured to regroup the control law flight components.

16. A method, comprising:

selecting a control law based upon a flight performance of an aircraft;

decoupling the control law into a first individual component and a second individual component of the aircraft flight motion;

analyzing each individual component separately; and regrouping the component of flight motion.

17. The method of claim 16, further comprising:

calculating each individual component with a Ricatti equation.

18. The method of claim 16, further comprising:

utilizing gain scheduling based upon the aircraft airspeed.

19. The method of claim 16, further comprising:

selecting a finite state machine operably associated with the control law.

20. The method of claim 16, further comprising:

commanding an actuator with the control law.

* * * * *